United States Patent
Muller et al.

(10) Patent No.: US 8,701,751 B2
(45) Date of Patent: Apr. 22, 2014

(54) HEAT EXCHANGER WITH INTERFACE PLATE FORMING A FLUID CIRCUIT

(75) Inventors: Christian Muller, Strasbourg (FR);
Jean-Louis Dupin, Muntzenheim (FR);
Jean-Claude Heitzler, Horbourg-Wihr (FR)

(73) Assignee: Cooltech Applications Société par actions simplifiée, Andolsheim (FR)

( * ) Notice: Subject to any disclaimer, the term of this patent is extended or adjusted under 35 U.S.C. 154(b) by 1484 days.

(21) Appl. No.: 10/583,912

(22) PCT Filed: Dec. 22, 2004

(86) PCT No.: PCT/FR2004/003332
§ 371 (c)(1),
(2), (4) Date: Mar. 27, 2007

(87) PCT Pub. No.: WO2005/064245
PCT Pub. Date: Jul. 14, 2005

(65) Prior Publication Data
US 2007/0199332 A1      Aug. 30, 2007

(30) Foreign Application Priority Data

Dec. 23, 2003  (FR) ...................................... 03 15257

(51) Int. Cl.
*F25B 29/00* (2006.01)
*F28D 15/00* (2006.01)
*F28F 7/00* (2006.01)

(52) U.S. Cl.
USPC .... 165/201; 165/80.2; 165/80.4; 165/104.33; 62/3.1; 361/688; 361/699

(58) Field of Classification Search
USPC ................. 165/80.2, 80.3, 80.4, 104.33, 201; 62/3.1; 361/689, 699, 700
See application file for complete search history.

(56) References Cited

U.S. PATENT DOCUMENTS

| | | | |
|---|---|---|---|
| 3,481,393 A | | 12/1969 | Chu |
| 4,138,692 A | * | 2/1979 | Meeker et al. ............... 165/80.4 |
| 4,644,385 A | * | 2/1987 | Nakanishi et al. ........... 165/80.4 |
| 5,144,531 A | * | 9/1992 | Go et al. ........................ 361/699 |
| 5,360,993 A | * | 11/1994 | Mine ......................... 165/104.33 |
| 5,509,468 A | * | 4/1996 | Lopez ........................... 361/689 |
| 5,731,954 A | * | 3/1998 | Cheon .......................... 361/699 |
| 6,166,907 A | * | 12/2000 | Chien .......................... 361/699 |

(Continued)

FOREIGN PATENT DOCUMENTS

| FR | 2 861 454 | * | 4/2005 | .............. F25B 21/00 |
|---|---|---|---|---|
| WO | WO 03/050456 | | 6/2003 | |

*Primary Examiner* — Ljiljana Ciric
(74) *Attorney, Agent, or Firm* — Davis & Bujold, PLLC; Michael J. Bujold

(57) ABSTRACT

A heat exchanger for connecting thermal elements to one another and an external circuit in series, in parallel or according to a mixed configuration which limits the risk of leakage and the number of connections. The heat exchanger includes calorie-emitting and negative calorie-emitting thermal elements, and a conduit which passes through each of the thermal elements and has inlet and outlet orifices that are connected to one another and to at least one thermal fluid circuit by an interface plate. The interface plate includes two supply orifices and two discharge orifices for connecting the interface circuits to external hot and cold circuits for using the calories and the negative calories recovered from the thermal fluid.

20 Claims, 27 Drawing Sheets

(56) References Cited

U.S. PATENT DOCUMENTS

| | | | |
|---|---|---|---|
| 6,437,981 B1 * | 8/2002 | Newton et al. | 361/700 |
| 6,467,274 B2 * | 10/2002 | Barclay et al. | 62/3.1 |
| 6,668,560 B2 * | 12/2003 | Zimm et al. | 62/3.1 |
| 6,804,117 B2 * | 10/2004 | Phillips et al. | 361/700 |
| 6,807,056 B2 * | 10/2004 | Kondo et al. | 361/689 |
| 6,826,915 B2 * | 12/2004 | Wada et al. | 62/3.1 |
| 6,888,720 B2 * | 5/2005 | Pfister et al. | 361/689 |
| 6,988,535 B2 * | 1/2006 | Upadhya et al. | 165/80.4 |
| 7,596,955 B2 * | 10/2009 | Muller et al. | 62/3.1 |
| 8,430,156 B2 * | 4/2013 | Malone et al. | 165/104.33 |
| 2002/0070007 A1 * | 6/2002 | Calaman et al. | 165/80.4 |

* cited by examiner

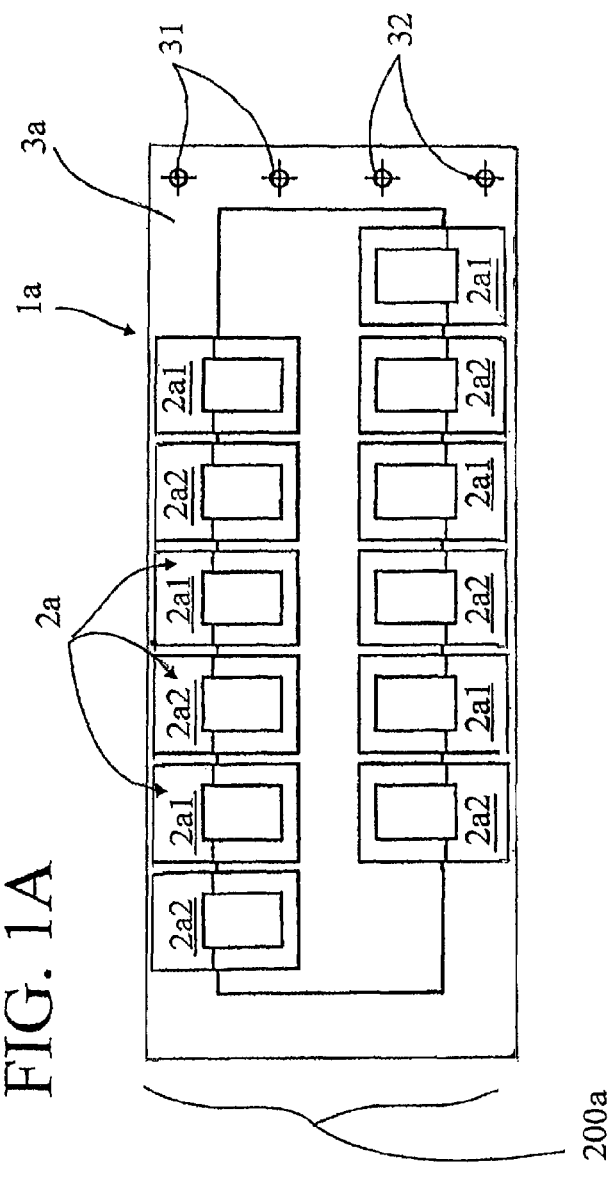
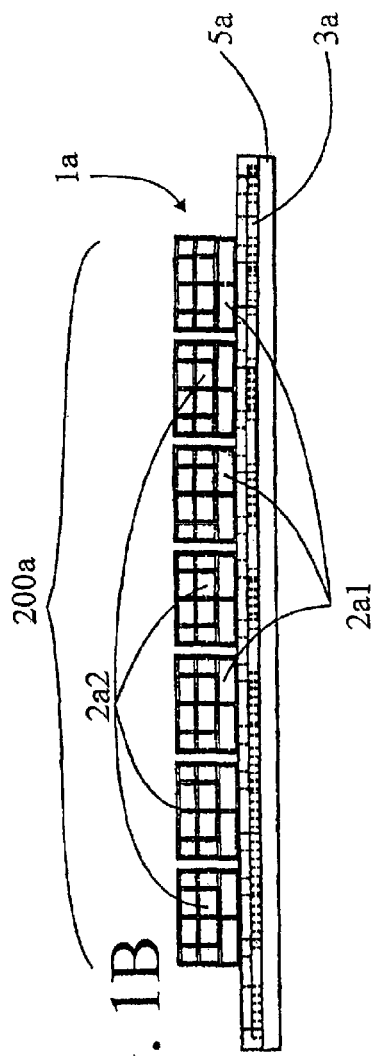
FIG. 1A
FIG. 1B

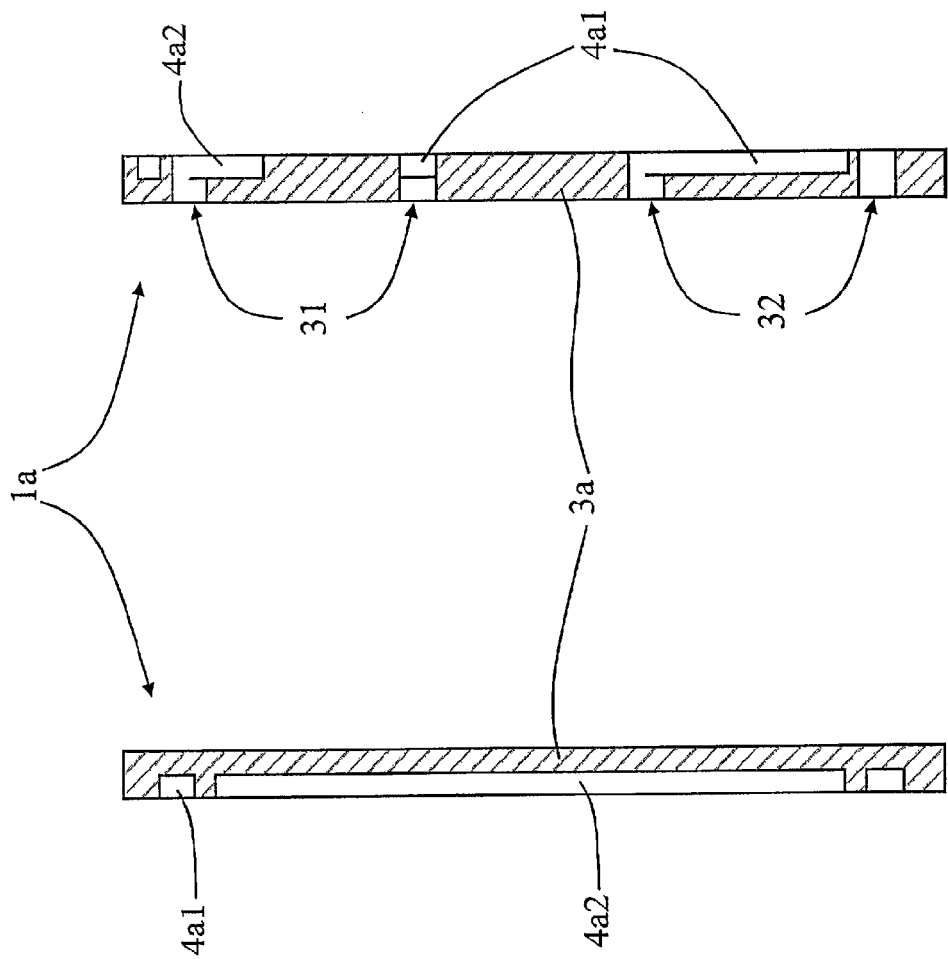

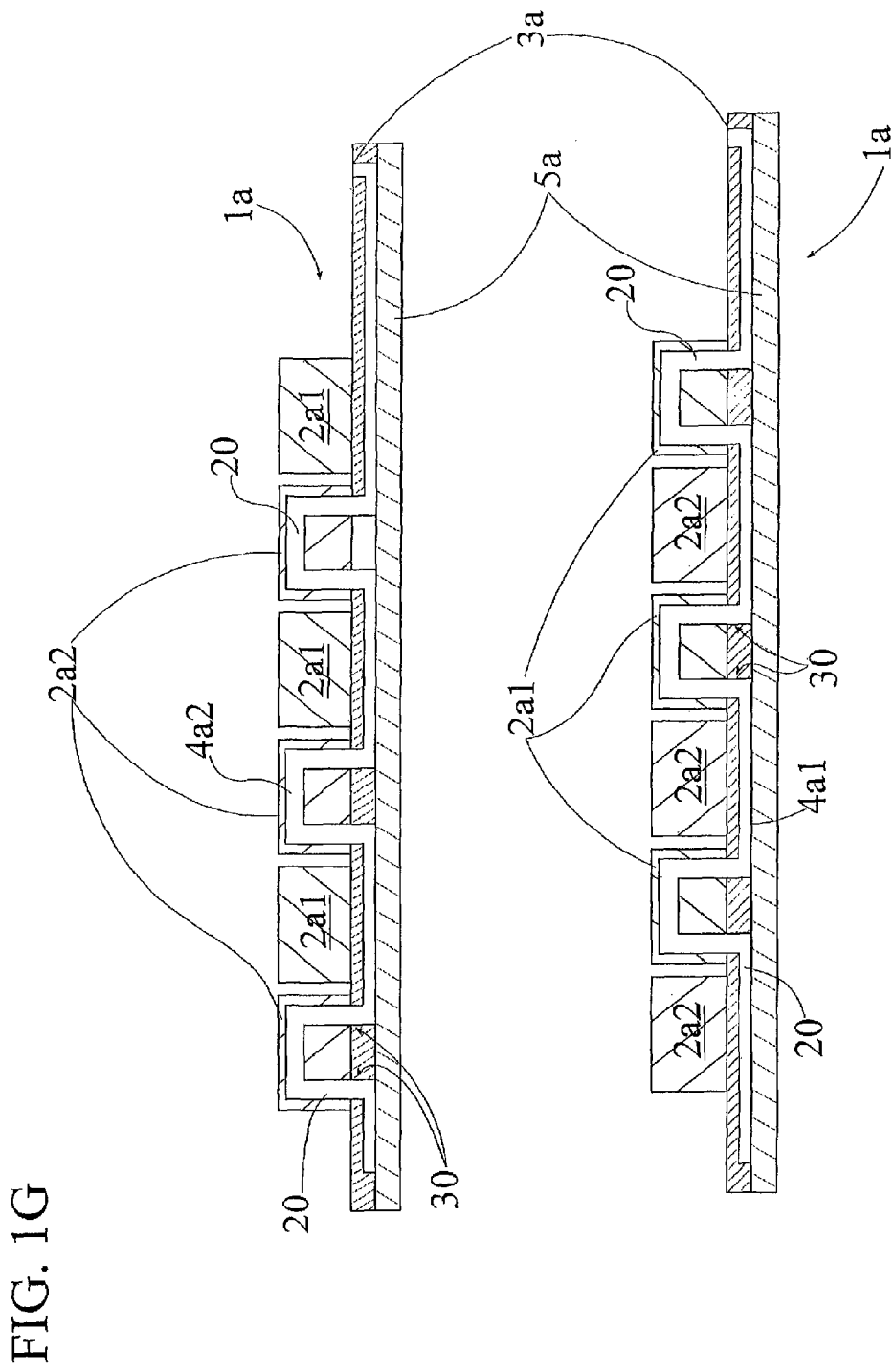

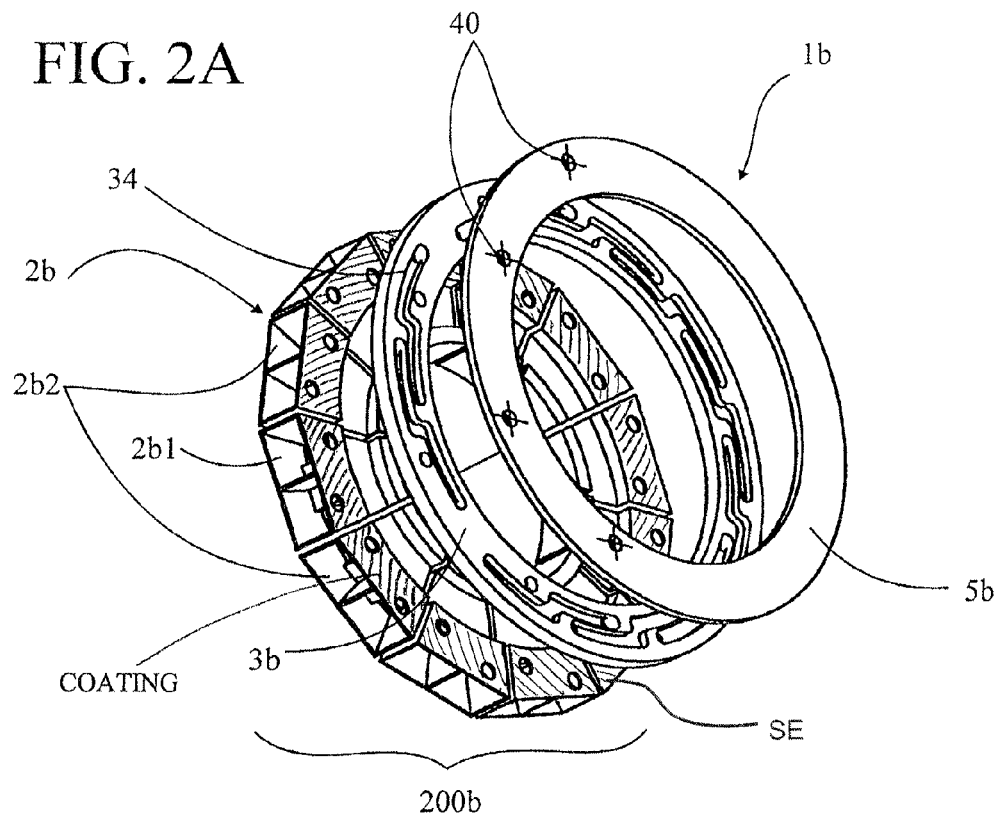
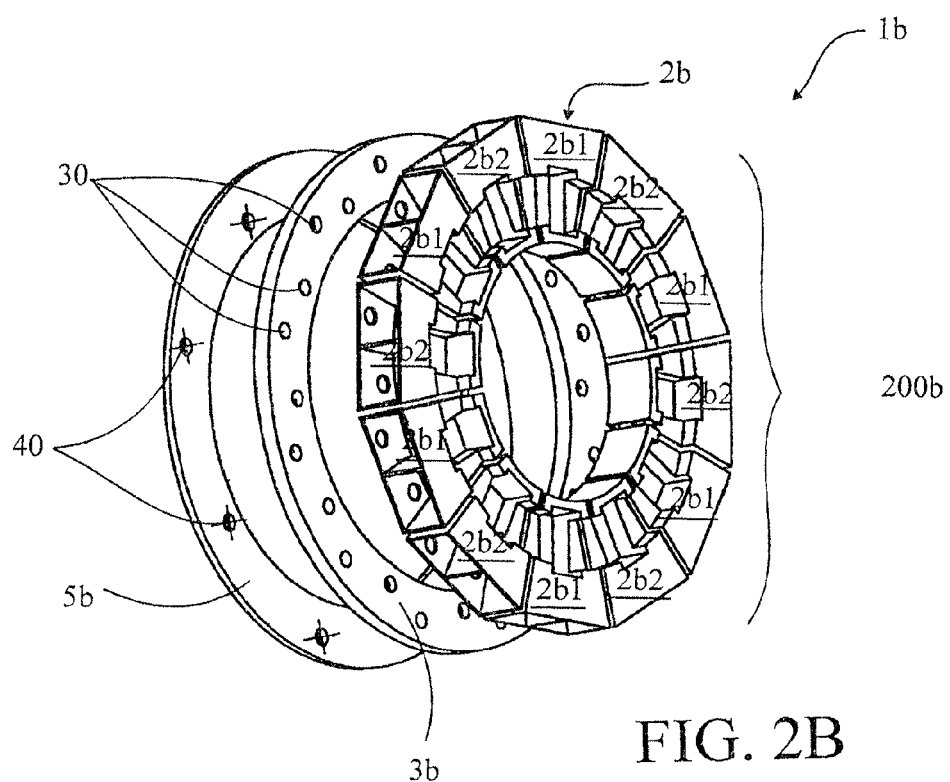

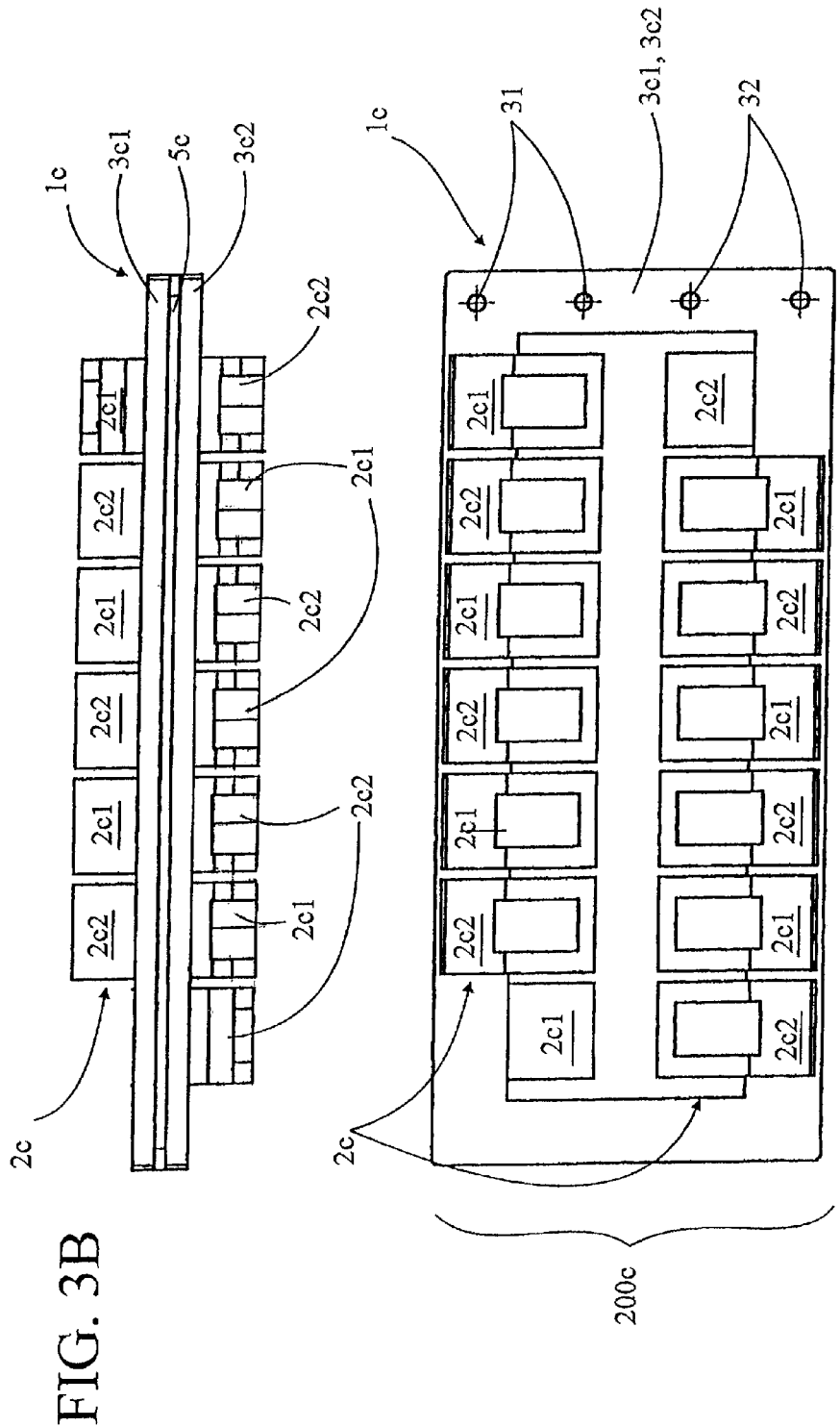

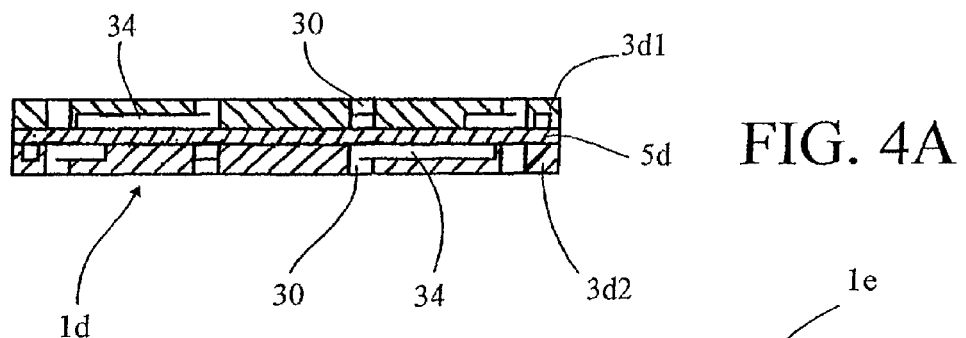
FIG. 4A
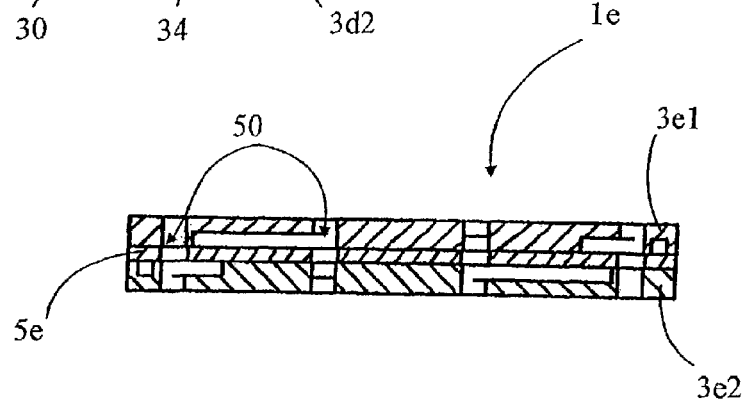
FIG. 4B
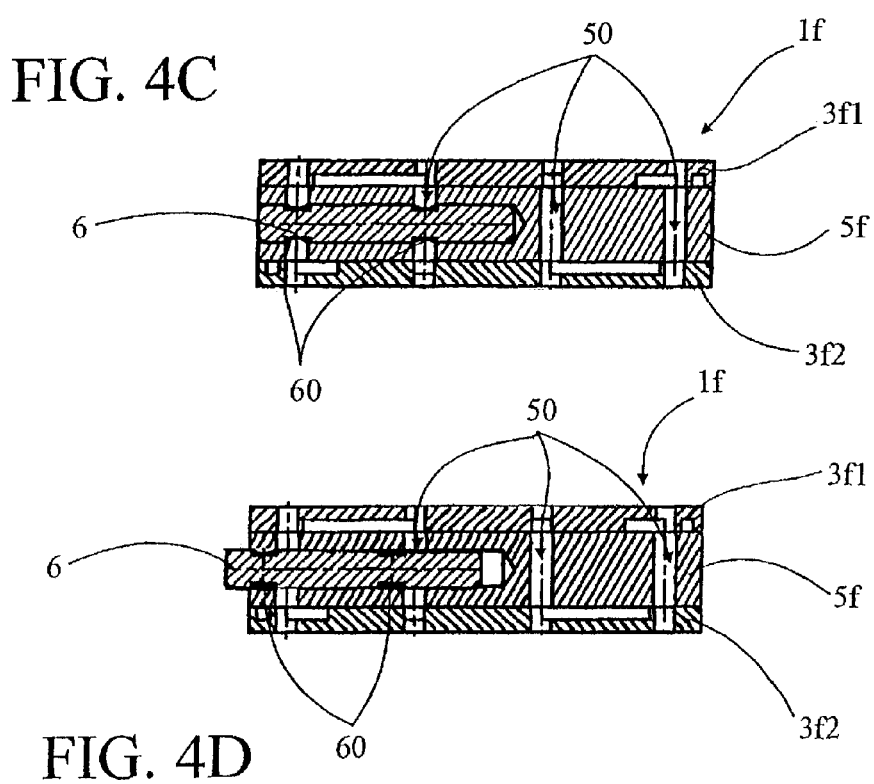
FIG. 4C
FIG. 4D

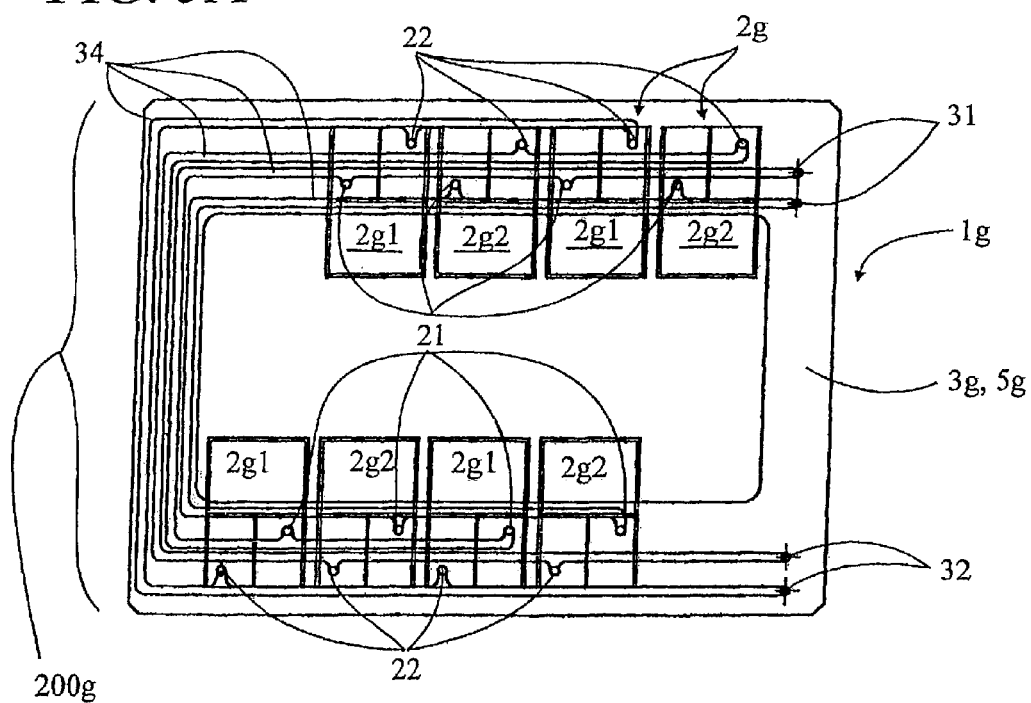

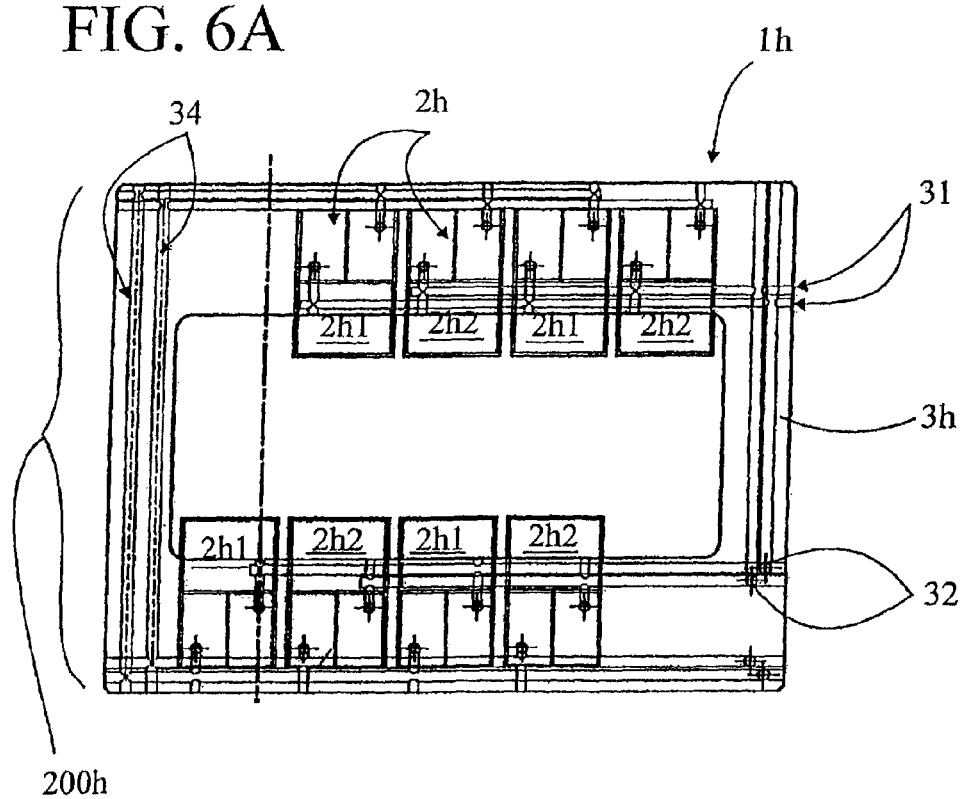

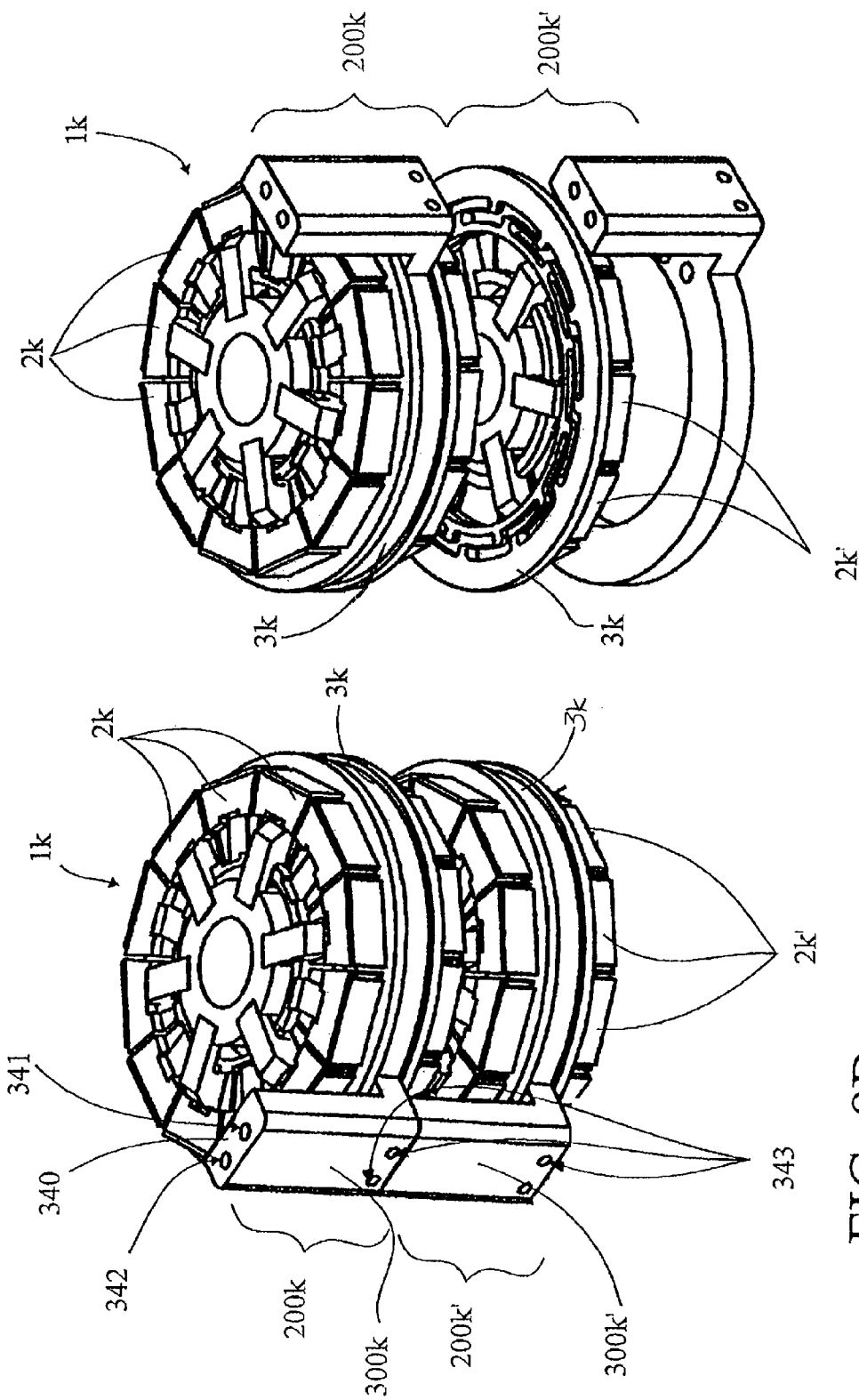

HEAT EXCHANGER WITH INTERFACE PLATE FORMING A FLUID CIRCUIT

This application is a national stage completion of PCT/FR2004/003332 filed Dec. 22, 2004 which claims priority from French Application Serial No. 03/15257 filed Dec. 23, 2003.

FIELD OF THE INVENTION

The present invention concerns a heat exchanger comprising at least one group of at least two calorie- and/or frigorie-emitting thermal elements, each equipped with at least one inlet orifice and at least one outlet orifice joined through at least one conduit traversing the thermal element, capable of receiving a thermal fluid for recovering the calories and/or frigories, the heat exchanger comprising means for interconnecting the conduits and at least one circuit external to the heat exchanger to utilize the calories and/or frigories recovered by the thermal fluid.

BACKGROUND OF THE INVENTION in the conventional manner, traditional heat exchangers comprise thermal elements connected to one another and to one or more external thermal fluid circuits using pipes, connectors, and seals. The connectors are preferably removable to facilitate installation and maintenance operations. This connection technique takes a long time to perform, requires a large number of parts, and makes achieving a tight seal on this type of heat exchanger difficult.

One example is illustrated in Publication WO-A-03/050456 which describes a magneto-caloric heat exchanger comprising twelve gadolinium based thermal elements alternately subjected to a magnetic field generated by a rotating permanent magnet. Each thermal element is provided with a minimum of four orifices, two inlet orifices and two outlet orifices, connected in pairs by conduits and joined to the external "hot" and "cold" circuits by turning seals. Each turning seal comprises seven connections selectively joining the conduits, depending upon the position of the permanent magnet, to the "hot" and "cold" external circuits EC. Thus, this heat exchanger comprises four turning seals per thermal element, either 48 connectors to which seven connections are added for each of the four turning seals, or 28 additional connectors, for a total of 76 connections. This large number of connectors proportionately increases the number of mechanical parts as well as increasing the risk of thermal fluid leaks. Moreover, it imposes considerable technical limitations on the heat exchanger that make it economically impractical. This is, therefore, not a very satisfactory solution.

Another connection technique is illustrated in Publications U.S. Pat. No. 4,644,385 and U.S. Pat. No. 5,509,468, which provide for the pipes to be replaced by rigid plates integrating the circulation channels for cooling fluid in electronic radiator circuits. In this type of application, the radiator comprises for each electronic circuit an individual plate for absorbing the dissipated calories, connected to a collector plate coupled with a heat exchanger. However, the connection between the different plates and the heat exchanger requires specific rigid or flexible connectors which may or may not include a valve. Thus, this solution does not eliminate the need for connecting parts with their associated disadvantages. Moreover, in this type of application, the cooling circuit is fixed rather than evolving, with its objective being simply the dissipation of calories.

SUMMARY OF THE INVENTION

The present invention attempts to overcome these disadvantages by proposing a thermal exchanger which simply, efficiently, reliably, and at moderate cost allows the thermal elements to be connected to one another and to one or more external circuits while simultaneously minimizing the risk of leakage, the number of parts, and facilitating maintenance operations. The invention proposes a thermal exchanger allowing the use of a large number of thermal elements and/or several groups of thermal elements that may be connected in a series, parallel or mixed configuration, with the number of elements and the connection configuration being easily modified.

For this purpose, the invention concerns a heat exchanger characterized in that the connection means comprises at least one interface plate placed flat against the thermal elements, comprising at least one channel equipped with connecting orifices located opposite the inlet and outlet orifices of the thermal elements and defining at least one interface circuit to allow thermal fluid to circulate between the thermal elements and the interface plate in a series, parallel, or mixed connection, the interface plate also being equipped with at least one supply orifice and at least one discharge orifice to connect the interface circuit with the exterior circuit.

In a preferred embodiment of the invention, the thermal elements alternately emit calories and frigories and the interface plate comprises at least two channels, each equipped with at least one supply orifice, one evacuation orifice, and connecting orifices, and disposed so as to define two distinct interface circuits connected to two external circuits.

Advantageously, the heat exchanger comprises at least two groups of thermal elements, each provided with at least one interface plate, and complementary connection elements designed to connect the interface plates to each other and to the interface circuits in the corresponding groups in a series, parallel or mixed connection.

According to a variation, the connection elements comprise at least two interface plates superimposed back to back, each comprising at least one channel, one supply orifice, one discharge orifice, and connecting orifices joined to a unit of thermal elements. These interface plates may comprise traversing orifices located opposite each other defining a common interface circuit.

The channel may be at least partially formed of a network of perforations through the interface plate and selectively blocked by plugs depending upon the interface circuit desired.

The channel may also be at least partially formed of one or more grooves on at least one surface of the interface plate, formed by machining, engraving, or casting. In this case, the connection elements advantageously comprise at least one closing plate superimposed on the interface plate on the side with the groove to form the channel.

The closing plate may be located between two interface plates in order to form a channel with each one. This closing plate may comprise traversing orifices opening into the channels and designed to connect them in a series, parallel, or mixed connection.

Preferably, the connecting means are made of a thermally insulating material and comprise seals located at least between the thermal elements and the interface plates, the seals possibly consisting of a coating or a sheet of "Teflon®," a liquid seal, or the like.

According to a preferred embodiment, the closing plate comprises a switch movable between at least two positions in order to modify the mode of connection between the interface circuits. This switch may be chosen from the group comprising at least a slide block, a core, or a sliding unit regulated by a control means.

BRIEF DESCRIPTION OF THE DRAWINGS

The advantages of the present invention will be more apparent from the following description of several embodiments, with reference to the attached drawings, provided by way of non-limiting examples, wherein:

FIGS. 1A-C are respectively views from above, from the side, and a transparent overhead view of a first embodiment of a heat exchanger according to the invention;

FIGS. 1E and 1F are cross-sections along lines AA and BB of the single interface plate of the heat exchanger of FIG. 1D;

FIGS. 1G and 1H are cross-sections of the heat exchanger in the preceding drawings in which the hot and cold thermal circuits are shown schematically;

FIGS. 2A, 2B and 2D are exploded perspective views from below, from above, and a side view, respectively, of a second embodiment of the heat exchanger according to the invention;

FIGS. 3A and 3B are views from above and from the side, respectively, of a third embodiment of the heat exchanger of the invention;

FIGS. 4A-D are cross-sectional side views of several embodiments of the conduit connectors for the heat exchanger according to the invention;

FIGS. 5A, 6A, 7A are overhead views of three other embodiments of heat exchangers according to the invention;

FIGS. 9A and 9B are partially exploded and unexploded complete perspective views, respectively, of another embodiment of the heat exchanger of the invention.

DETAILED DESCRIPTION OF THE INVENTION

With reference to the drawings, and in known manner, the heat exchanger $1a$-$o$ comprises one or several groups $200a$-$o$ of calorie- and/or frigorie-emitting thermal elements $2a$-$o$ on a support to which they are attached by a permanent or temporary attachment means (not shown), such as, for example, gluing, soldering, bolting, setting, or casting.

Figure 12:
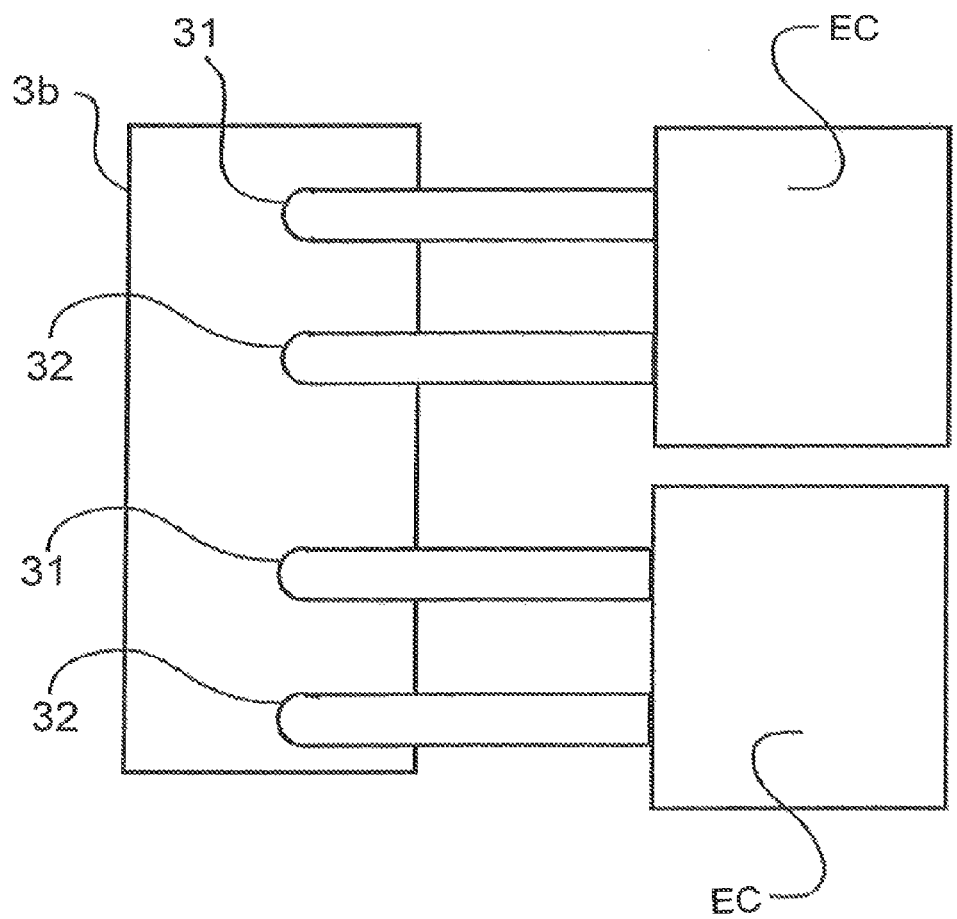
FIG. 12 is a simplified representation of the interface plate connected to an eternal circuit.

In the examples shown, thermal elements $2a$-$o$ are the magneto-calorie type. It is obvious that they could be any other type functioning according to any other adapted principle. Each thermal element $2a$-$o$ contains a magneto-calorie material such as gadolinium (Gd), for example, or any other equivalent material. Thus, when thermal element $2a$-$o$ is subjected to the presence of a magnetic field, it heats up and when the magnetic field disappears, it cools to a temperature lower than its initial temperature. The operating principle of heat exchangers $1a$-$o$, given by way of example, consists, therefore, of alternately subjecting thermal elements $2a$-$o$ to the presence and absence of a magnetic field and recovering the calories and/or frigories successively emitted by each thermal element $2a$-$o$ using a circulating thermal fluid. In order to do this, the magnetic field is designed to be movable relative to the thermal elements and/or variable, and each thermal element $2a$-$o$ is traversed by at least one conduit 20 with its inlet orifices 21 and outlet orifices 22 connected by connecting means $3a$-$o$ to one or more external circuits EC (as shown in FIG. 12) through which the thermal fluid is caused to circulate and the calories and/or frigories are used in a piece of equipment to heat, cool, air condition, or regulate the temperature of the atmosphere.

The number of thermal elements $2a$-$o$ provided in each group $200a$-$o$ can be adapted to need and to the type of operation desired.

In the examples shown, conduit 20 traversing thermal elements $2a$-$o$ is U-shaped. Obviously, it could have any other adapted shape. According to a variation that is not shown, conduit 20 may comprise, for example, an internal chamber to receive magneto-caloric material which may consist of pellets.

The magnetic field may be generated by permanent magnets, for example, or by magnetic assemblies (not shown) spanning elements $2a$-$o$ and grouped by fives to exert force on every other thermal element $2a$-$o$. The magnetic field may also be generated by adjacent permanent magnets (not shown) alternately and simultaneously exerting force on all the thermal elements $2a$-$o$. The permanent magnets are fixed or coupled with displacement means (not shown) to make them movable relative to thermal elements $2a$-$o$. These displacement means may be alternating, stepping, or continuous and they may generate rotating, pivoting, translational, or any combination of movement on the part of the permanent magnets; the trajectory may follow a helical, circular, sinusoidal translational path or any other adapted translational trajectory. The displacement means may comprise, for example, a motor, a cylinder, a spring mechanism, an aerogenerator, an electromagnet, a hydrogenerator, or any other equivalent means. The electromagnets may also be aligned side by side to attract all the thermal elements in a single series.

According to the invention, the connection elements for the heat exchanger $2a$-$o$ comprise at least one interface plate $3a$-$o$ provided with one or more channels 34. These channels 34 comprise connecting orifices 30 joined directly to inlet orifice 21 and outlet orifice 22 allowing communication between conduits 20 in the different thermal elements $2a$-$o$ and defining one or more interface circuits $4a$-$o$ so as to allow thermal fluid to circulate between thermal elements $2a$-$o$. This interface plate $3a$-$o$ is also equipped with one or more supply orifices 31 and discharge orifices 32 for connecting the interface circuit or circuits $4a$-$o$ with one or more external circuits EC, for example, a "hot" external circuit EC and a "cold" external circuit EC.

Figure 10:
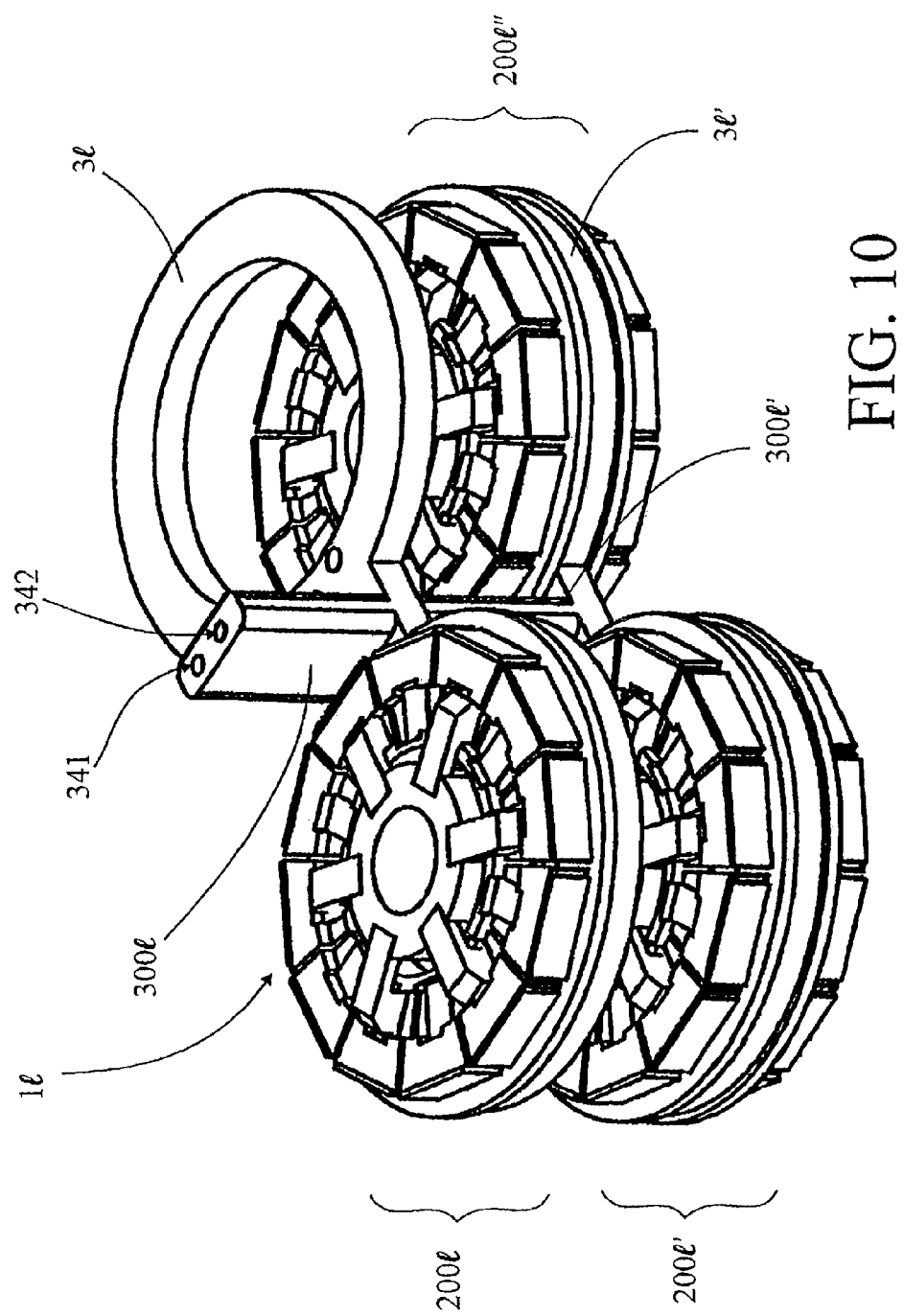
FIGS. 10 and 11A-C are perspective views of other embodiments of the heat exchanger according to the invention.

In the examples shown in FIGS. 1-8, thermal heat exchangers $1a$-$j$ each comprise a single group $200a$-$j$ of thermal elements $1a$-$j$, whereas with reference to FIGS. 9-11, heat exchangers $1k$-$o$ each comprise several groups $200k$-$o$ of thermal elements $1k$-$o$. The purpose of these different examples is to show the multiple combinations that are possible with the present invention.

With reference to FIGS. 1A-J and according to a first embodiment, heat exchanger 1*a* comprises a group 200*a* of two rows of six alternating thermal elements 2*a*1, 2*a*2 joined to an interface plate 3*a* forming a rectilinear frame. Thermal elements 2*a*1, 2*a*2 are simultaneously subjected to the presence and absence of a magnetic field and are joined to interface plate 3*a* so as to define two distinct interface circuits 4*a*1, 4*a*2. This heat exchanger 1*a* therefore allows simultaneous recovery of the calories emitted by thermal elements 2*a*1 in a first unit by means on the first interface circuit 4*a*1 and of the frigories emitted by thermal elements 2*a*2 on the second unit by means of the second interface circuit 4*a*2, and vice versa.

Interface plate 3*a* may be made of a thermally insulating, mechanically rigid material such as, for example, a composite or synthetic material or other equivalent material. It may also be made of a thermally conductive material such as a metal alloy or porcelain and it may be thermally insulated at the exterior walls, for example, using some type of adapted covering. This interface plate 3*a* comprises four orifices, of which two supply orifices 31 and two discharge orifices 32 are connected by conventional connection means to two external circuits EC, one being a "hot" external circuit EC and one a "cold" external circuit EC.

A switching means (not shown) may be interposed for toggling between one exterior circuit and the other, and vice versa. The switching means allows each interface circuit 4*a*1, 4*a*2 to be connected alternately to the exterior "hot" circuit and then the exterior "cold" circuit. It may comprise valves, electrically, pneumatically or hydraulically controlled slide mechanisms, or any other adapted means. The exterior circuits comprise free or forced thermal fluid circulation means (not shown) such as for example a pump or other equivalent means. Each "hot" or "cold" external circuit EC is additionally equipped with one or more heat exchangers for calories or frigories, respectively, or other equivalent means allowing diffusion and utilization of these calories and frigories. Depending upon the application, the external circuits EC may also comprise a means for reversing the direction in which the thermal fluid circulates.

Interface plate 3*a* is designed to lie flat against thermal elements 2*a* and to ensure connection by means of simple contact without any additional mechanical connector. For this purpose, it comprises connecting orifices 30 joined in pairs by grooves formed on the surface of interface plate 3*a* opposite thermal elements 2*a*1, 2*a*2 opposite inlet orifices 21 and outlet orifices 22 on each thermal element 2*a*1, 2*a*2. Interface plate 3*a* is superimposed on a closing plate 5*a* by the grooves to form channel 34. Interface plate 3*a*, closing plate 5*a*, and thermal elements 2*a*1, 2*a*2 are assembled with seals (as shown in FIG. 2A) such as, for example, a sheet of "Teflon®," a liquid seal, or a specific coating. These sealing elements, when provided between interface plate 3*a* and thermal elements 2*a*1, 2*a*2, comprise orifices for the passage of thermal fluid opposite connecting orifices 30.

The grooves are arranged so as to connect inlet orifice 21 of the first thermal element 2*a*1, 2*a*2 of each unit to a supply orifice 31 and a discharge orifice 22 of the last thermal element 2*a*1, 2*a*2 of each unit to a discharge orifice 32. Excluding the already connected inlet orifices 21 and outlet orifices 22, on each unit the grooves connect the outlet orifice 22 of one thermal element 2*a*1, 2*a*2 to the inlet orifice 21 on the next thermal element 2*a*1, 2*a*2. Thermal elements 2*a*1 and 2*a*2 in the same unit are thus respectively connected in series. In order to avoid any crossover between interface circuits 4*a*, the grooves follow a semi-crenellated trajectory on the perimeter. The grooves may be formed by machining, stamping, or casting.

Interface plate 3*a*, such as the one shown, may easily be adapted to a larger number of thermal elements 2*a* in order to increase the thermal capacity of heat exchanger 1*a*.

The operation of heat exchanger 1*a* can be broken down into two stages, between which the switching means are toggled and the magnetic field is modified. Thus, as each stage changes, the first unit of thermal elements 2*a*1 previously subjected to the magnetic field is subjected to the absence of magnetic field, and conversely for the second unit of thermal elements 2*a*2. Moreover, the first interface circuit 4*a*1 previously connected to the exterior "hot" circuit is connected to the exterior "cold" circuit, and conversely for the second interface circuit 4*a*2.

In a first stage of operation, thermal elements 2*a*1 on the first unit subjected to the magnetic field heat up and heat the thermal fluid present in first interface circuit 4*a*1. In parallel, thermal elements 2*a*2 on the second unit, which are no longer subjected to the magnetic field, cool down, reaching a temperature that is lower than their initial temperature and cooling the thermal fluid present in second interface circuit 4*a*2.

In this series configuration, thermal fluid enters interface plate 3*a* through one of the supply orifices 31. The thermal fluid in the first interface circuit 4*a*1 is heated to a temperature +t1 by first thermal element 2*a*1 on the first unit subjected to the magnetic field. It is then guided by channel 34 toward second thermal element 2*a*1 which heats it to a temperature +t2, higher than +t1, and so forth, until reaching the last thermal element 2*a*1. Next, the heated thermal fluid exits interface plate 3*a* through one of the discharge orifices 32, guided toward the external "hot" circuit where the calories are evacuated, recovered, and utilized, using one or more calorie exchangers, for example.

Simultaneously, the thermal fluid in second interface circuit 4*a*2 is cooled down to a temperature −t1 by first thermal element 2*a*2 on the second unit not subjected to the magnetic field. It is then guided by channel 34 toward second thermal element 2*a*2 which cools it to temperature −t2, lower than −t1, and so forth, until reaching the last thermal element 2*a*2. Next, the cooled thermal fluid exits interface plate 3*a* through the other the evacuation orifice 32, guided toward the external "cold" circuit where the frigories are evacuated, recovered, and utilized, using one or more frigorie exchangers, for example.

The second stage is essentially similar to the first stage, with "heating" thermal elements 2*a*1 becoming "cooling" and "cooling" thermal elements 2*a*2 becoming "heating," The operation continues by alternating between the first and second stages.

Heat exchanger 1*a* in this first embodiment may be connected to another similar or dissimilar heat exchanger 1*a* in series, in parallel or a mixture of series/parallel. This connection may be done conventionally using pipes or using an interface connecting plate (not shown) allowing interface plates 3*a* of each heat exchanger 1*a* to communicate, or even using multiple interface plates to replace the two interface plates 3*a* and the connecting plate.

With reference to FIGS. 2A-D and according to a preferred embodiment of the invention, heat exchanger 1*b*, essentially similar to the preceding one, is differentiated by its circular configuration, which allows activation of the magnetic elements in a continuous circular movement instead of the rectilinear, alternating movement in the case of the linear configuration. It comprises a group 200*b* of twelve thermal elements 2*b*1, 2*b*2 in the form of circular sections supported by an interface plate 3b forming a ring and provided with four openings, two of which are supply orifices 31 and two of which are discharge orifices 32. Connecting orifices 30 and channels 34 provided in interface plate 3b are essentially similar to the preceding elements. Interface plate 3b is attached to a closing plate 5b comprising traversing orifices 40 opposite supply orifices 31 and discharge orifices 32 on interface plate 3b. Thermal elements 2b1, 2b2 and interface plate 3b define two interface circuits 4b1, 4b2. The operation of this heat exchanger 1b is essentially similar to the preceding one. Heat exchanger 1b of this second embodiment can also be connected to another similar or dissimilar heat exchanger 1b in series, in parallel or a series/parallel mixture.

According to another embodiment shown by FIGS. 3A-E, heat exchanger 1c comprises a group 200c consisting of two superimposed and combined heat exchangers essentially similar to those of FIGS. 1A-J. This heat exchanger 1c therefore comprises four rows of six thermal elements 2c1, 2c2, two rows being supported by a first interface plate 3c1 and two other rows being supported by a second interface plate 3c2 superimposed on first plate 3c1. Each interface plate 3c1, 3c2 is similar to interface plate 3a. It comprises four orifices, two supply orifices 31 and two discharge orifices 32, with connecting orifices 30 and channels 34 identically organized. Interface plates 3c1, 3c2 are separated by a closing plate 5c comprising traversing orifices 50 located opposite supply orifices 31 and discharge orifices 32 on the two interface plates 3c1, 3c2 to connect their interface circuits (not shown) in parallel. Interface plates 3c1 and 3c2 and closing plate 5c are assembled using permanent or temporary attachment means such as, for example, gluing, soldering, screwing, setting, casting The operation of this heat exchanger 1c is essentially similar to that of FIGS. 1A-J. Interface plates 3c1, 3c2 may be made differently, one connecting thermal elements 2c1, 2c2, which it supports in series, and the other connecting thermal elements 2c1, 2c2 which it supports in parallel as described below. In the example described, entry orifices 31 and evacuation orifices 32 on the two interface plates 3c1, 3c2 are superimposed and connected in parallel by orifices 50 traversing closing plate 5 and then connected to the external circuits EC.

According to a first variation which is not shown, it is possible to join interface plates 3c1, 3c2 in series, for example, by providing that closing plate 5c comprises:
a supply orifice connected to the supply orifice on a first interface plate 3c1;
a channel connecting the discharge orifice on the first interface plate 3c1 to a supply orifice on second interface plate 3c2;
a discharge orifice connected to the discharge orifice of second interface plate 3c2, with the channel possibly being formed by a groove or by a perforation.

According to a second variant shown in FIG. 4A, heat exchanger 1d, only the connecting elements of which are shown, comprises interface plates 3d1, 3d2 separated by a closing plate 5d preventing any passage of thermal fluid between the two.

According to a third variant shown in FIG. 4B, heat exchanger 1e, only the connecting elements of which are shown, comprises interface plates 3e1, 3e2 separated by a closing plate 5e equipped with traversing orifices 50 allowing thermal fluid to pass through them to define a common interface circuit.

According to a fourth variant not shown, the heat exchanger may comprise superimposed interface plates without any closing plate. In this case the channels in these interface plates may comprise one or more traversing orifices 20 allowing thermal fluid to pass from one to the other to define a common interface circuit.

According to a fifth variation not shown, the thermal exchanger comprises interface plates having channels without any traversing orifice, with the interface circuits remaining independent.

FIGS. 4C and 4D show a sixth variant wherein closing plate 5f comprises a switch 6 movable between an open position (cf. FIG. 4C) and a closed position (cf. FIG. 4D). In the open position switch 6 allows passage of thermal fluid into one portion of closing plate 5f from one interface plate 3f1 to the other interface plate 3f2, and defines a portion of the interface circuit. In the closed position (cf. FIG. 4D) switch 6 prevents the passage of thermal fluid through a portion of closing plate 5f. In this example, switch 6 is a circular core with circular grooves 60. In the open position, circular grooves 60 are aligned with traversing orifices 50 on closing plate 5f allowing them to communicate. In the closed position circular grooves 60 are offset to prevent communication.

According to other embodiments not shown, switch 6 may be a slide block or a sliding element with its translational or rotational movement regulated by a control means associated with the elements driving the permanent magnets. It is also possible for switch 6 to move between a larger number of positions. Switch 6, depending on its position, its design, and that of the traversing orifices, effects the connection of the interface circuits on interface plates 3f1, 3f2 in series, in parallel, or a series/parallel mixture.

Figure 5B:
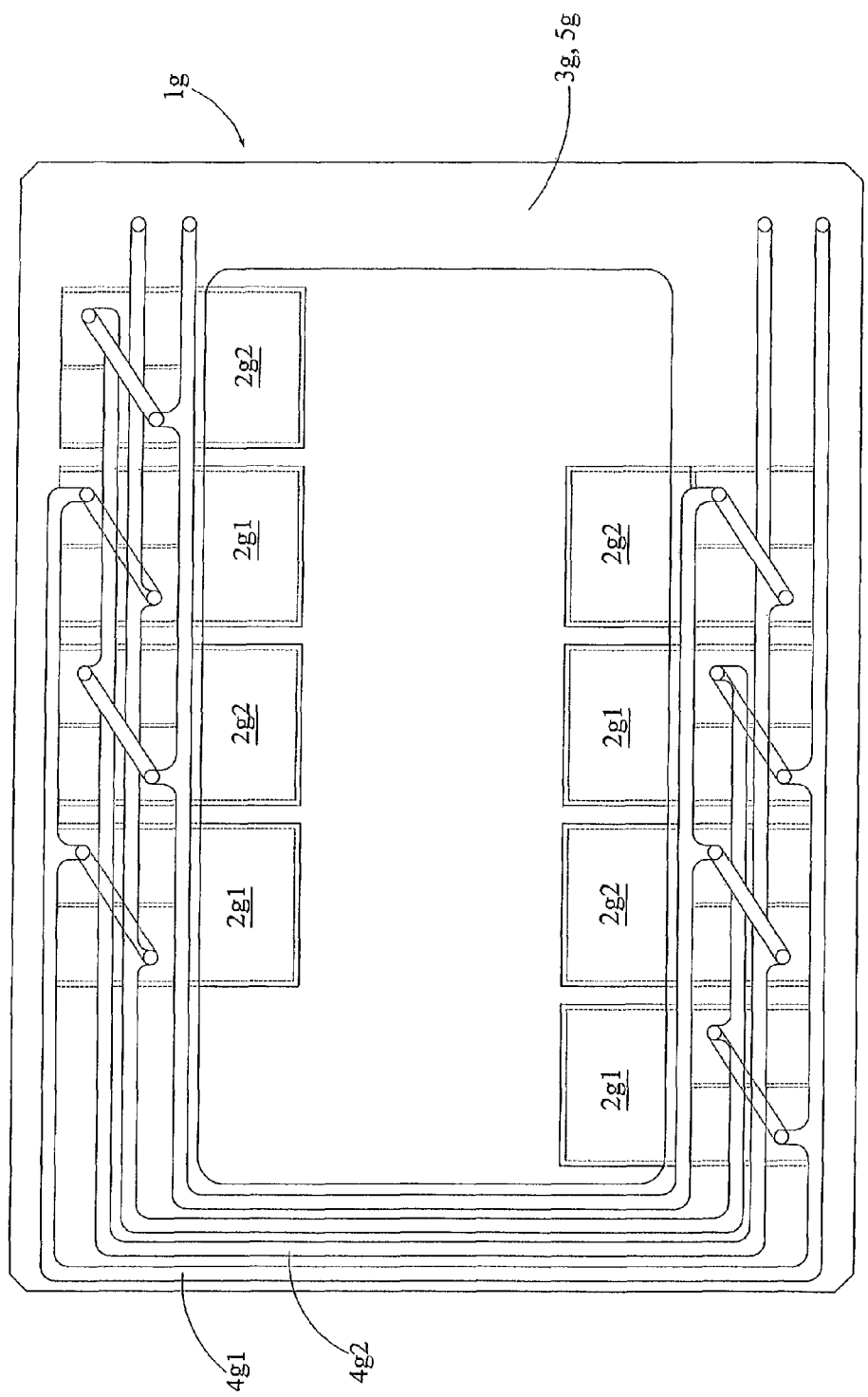
FIGS. 5B, 6B, 7B are views similar to FIGS. 5A, 6A, 7A with their hot and cold thermal circuits shown schematically.

According to a fourth embodiment illustrated by FIGS. 5A and 5B, heat exchanger 1g comprises a group 200g of two rows of four interface elements 2g1, 2g2 supported by an interface plate 3g forming a rectilinear frame. This interface plate 3g comprises two channels 34 designed so as to connect in parallel:
all the inlet orifices 21 of thermal elements 2g1 in a first unit with a first supply orifice 31;
all the outlet orifices 22 of thermal elements 2g1 in the first unit with a first discharge orifice 32 and similarly,
all the inlet and outlet orifices 21 and 22 on thermal elements 2g2 of second unit 2, respectively, with second supply orifices 31 and discharge orifices 32.

This configuration thereby allows the definition of two interface circuits 4g1 and 4g2, within each of which the interface elements 2g1 and 2g2 are respectively connected in parallel. As in the preceding examples, supply orifices 31 and discharge orifices 32 on interface plate 3g are connected to external circuits EC.

The operation of this heat exchanger 1g can be broken down into two stages:
a first stage in which thermal elements 2g1 on the first unit, which are subject to the magnetic field are heated and simultaneously heat the thermal fluid present in first interface circuit 4g1 and wherein, simultaneously, thermal elements 2g2 on the second unit, which are not subjected to the magnetic field are cooled and simultaneously cool the thermal fluid present in second interface circuit 4g2; and
a second step in which the situation is reversed, with thermal elements 2g1 of the first unit, which are no longer subjected to the magnetic field cooling down, and thermal elements 2g2 of the second unit, which are subjected to the magnetic field heating up.

The passage from one stage to the other takes place through the switching elements and by displacing the magnetic field.

In this parallel configuration the thermal fluids simultaneously enter interface plate 3g through two supply orifices 31. The thermal fluid in first interface circuit 4g1 is simultaneously reheated to a temperature +t by the unit of thermal elements 2g1 in the first unit subjected to the magnetic field. It is then guided toward the exterior of interface plate 3g by a first discharge orifice 32 toward the external "hot" circuit where the calories are evacuated, recovered, and utilized, for example, by means of one or more calorie exchangers. At the same time, the thermal fluid in second circuit 4g2 is simultaneously cooled to a temperature −t by the unit of thermal elements 2g2 on the second unit not subjected to the magnetic field. It is then guided toward the exterior of interface plate 3g by second evacuation orifice 32 toward the external "cold" circuit where the frigories are evacuated, for example, by means or one or more frigorie exchangers.

Figure 6B:
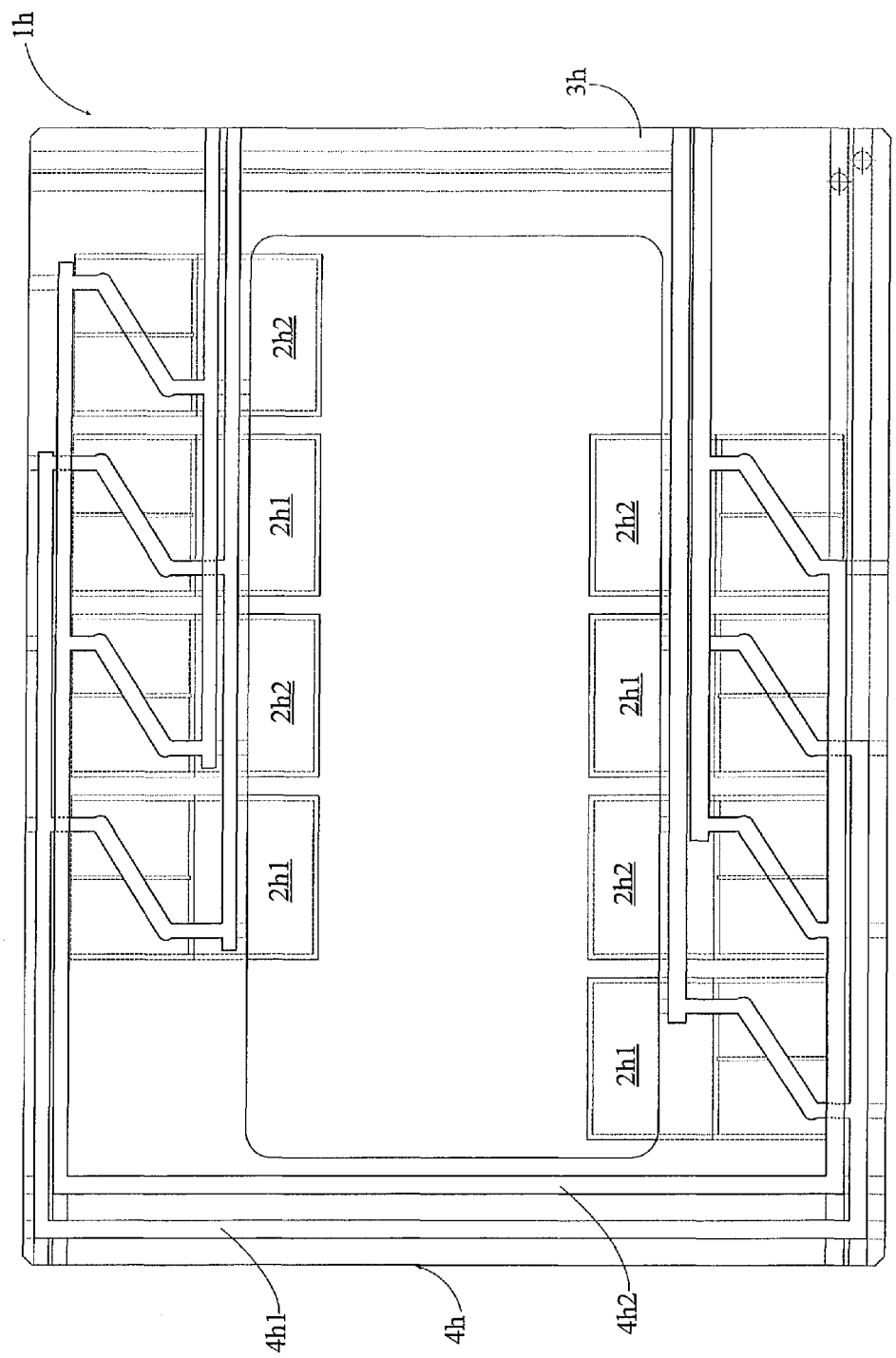

With reference to FIGS. 6A and 6B and according to a fifth embodiment, heat exchanger 1h, essentially similar to the preceding one, is differentiated by its channels 34 formed of a network of perforations traversing interface plate 3h. This traversing perforations, which may be formed by casting, machining, or any other adapted technique, are equipped with stoppers (not shown) permitting selective blockage to form interface circuits 4h1, 4h2. According to the configuration chosen, these traversing perforations may be located on a single level within interface plate 3h or on different levels, thereby preventing crossover. This solution offers the advantage of not requiring any closing plate. The operation of this heat exchanger 1h is essentially similar to the preceding one, with thermal elements 2h1, 2h2 in each unit being connected in parallel to define two interface circuits 4h1, 4h2.

Figure 7A:
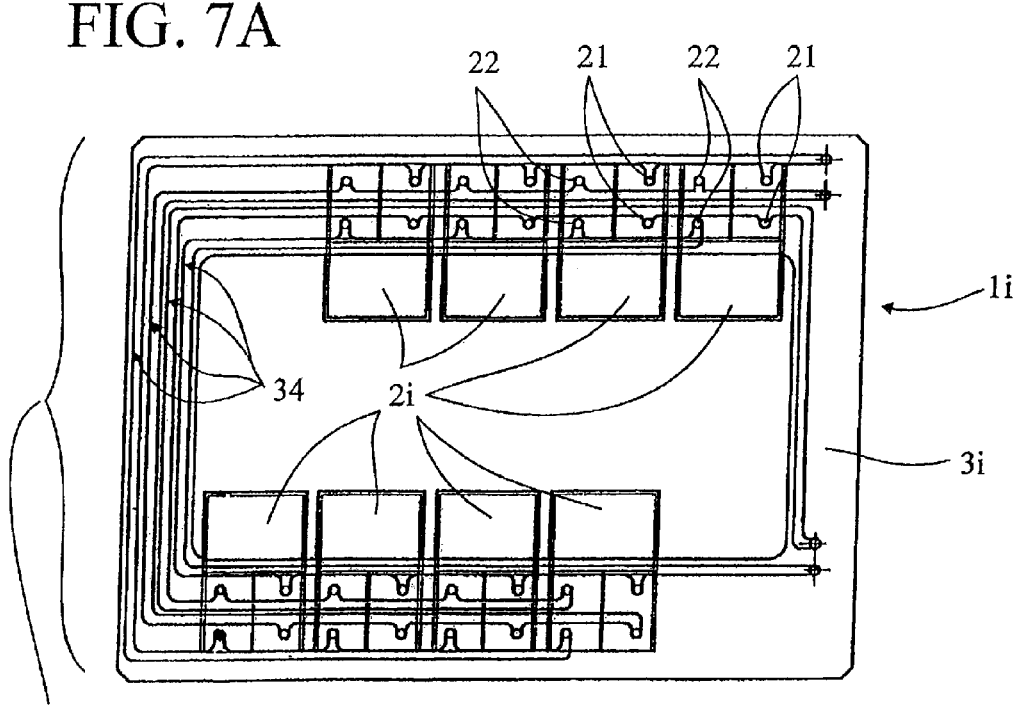
Figure 7B:
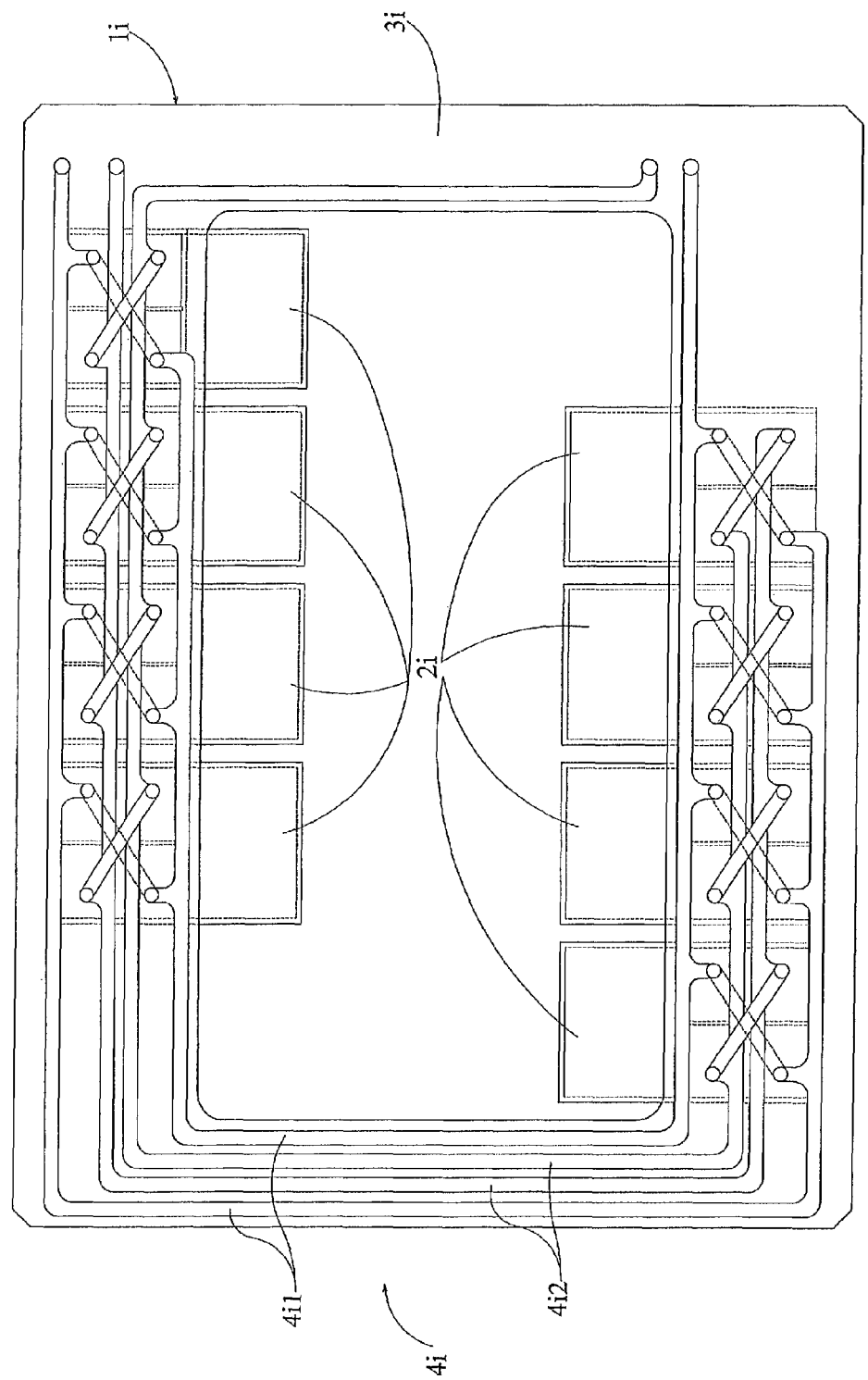

With reference to FIGS. 7A and 7B and according to a sixth embodiment, heat exchanger 1i, essentially similar to the one in FIGS. 5A and 5B, is differentiated by the fact that each of its thermal elements 2i is traversed by two conduits and thus comprises four orifices, two of which are inlet orifices 21 and two of which are outlet orifices 22. Channels 34 on interface plate 3i simultaneously connect all the thermal elements 2i to a first interface circuit 4i1 and these same thermal elements 2i to a second interface circuit 4i2, the interface circuits 4i1 and 4i2 being independent. The operation of this heat exchanger 1i can be broken down into two stages represented schematically and superimposed in FIG. 7B:

a first stage in which all the thermal elements 2i are subjected to the magnetic field, heating up and heating the thermal fluid present in the first interface circuit 4i1; and a second step in which all the thermal elements 2i are no longer subjected to the magnetic field, cooling down and cooling the thermal fluid present in the second interface circuit 4i2.

The passage from one stage to the other is obtained by alternately supplying the fixed electromagnets located opposite thermal elements 2i. This heat exchanger 1i can obviously be combined with another similar or dissimilar thermal exchanger 1i, diagonally from the connecting interface plate, or any other adapted means.

Figure 8A:
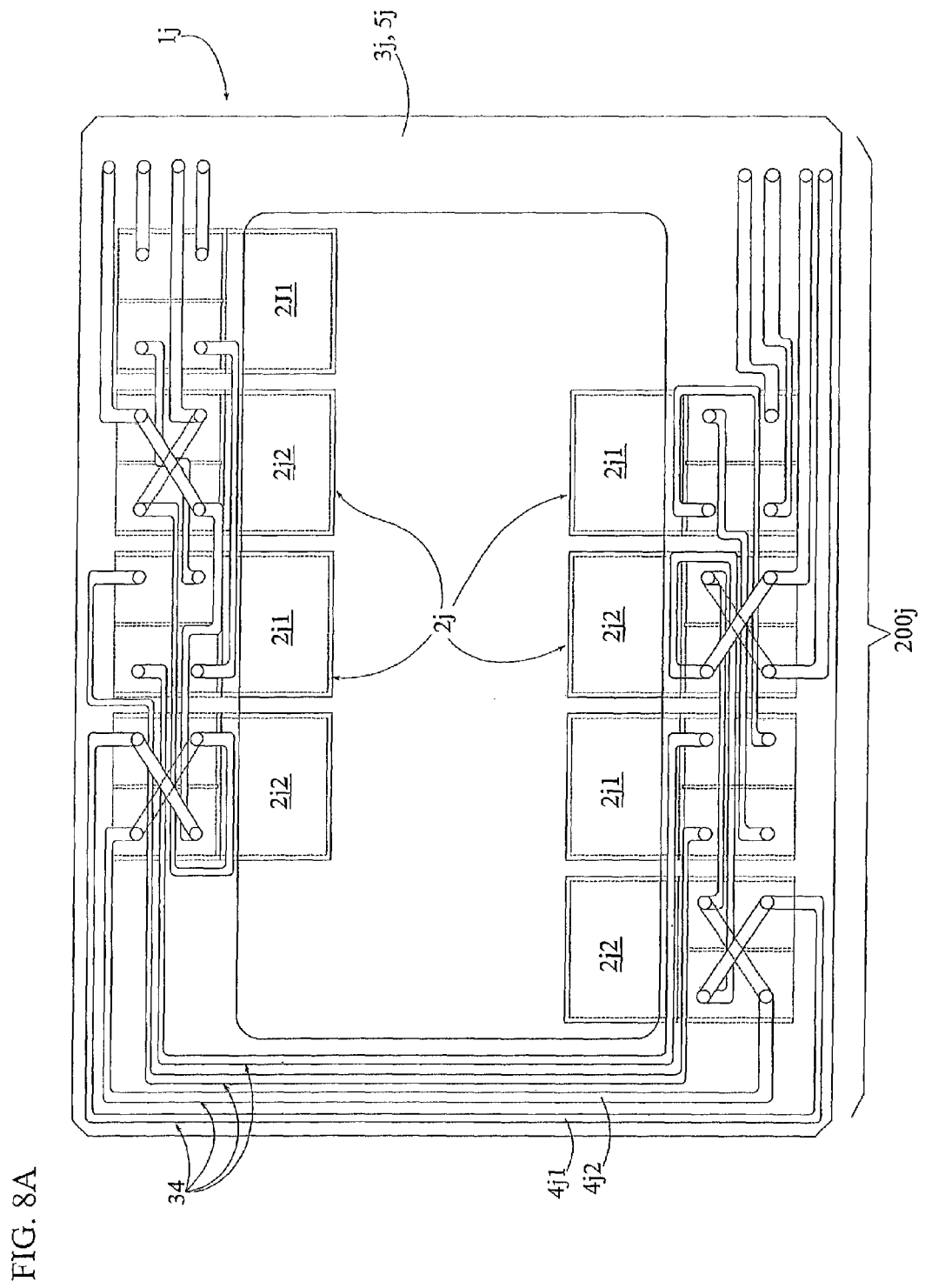
FIGS. 8A and 8B are overhead views of another embodiment of a heat exchanger, according to the invention, with a portion of the hot and cold thermal circuits shown schematically on each one.
Figure 8B:
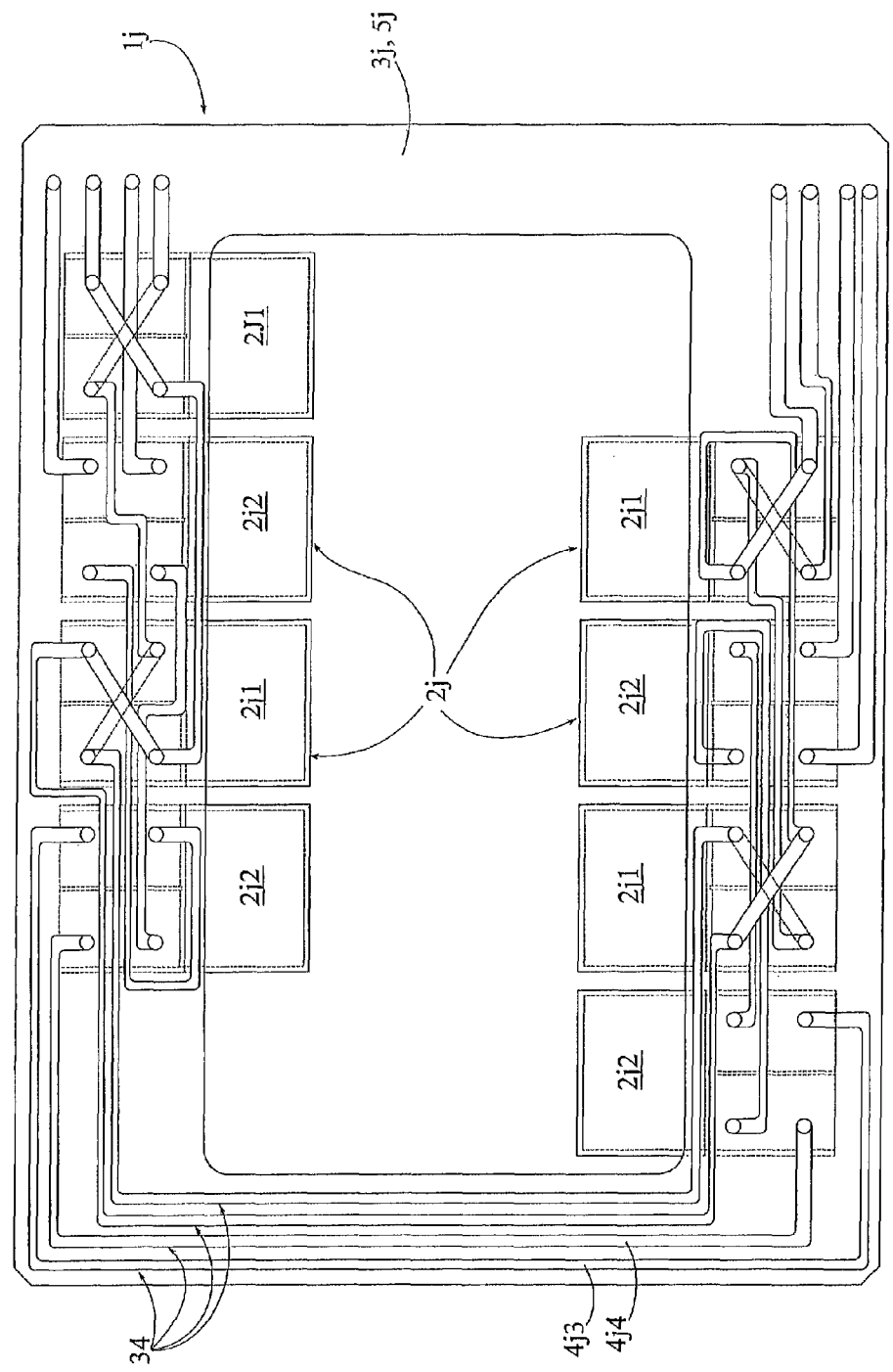

FIG. 8A shows a heat exchanger 1j essentially similar to the preceding one. Thermal elements 2j1 and 2j2 supported by interface plate 3j are traversed by two conduits connected in series. The operation of this thermal heat exchanger 1j can be broken down into two stages, shown separately by FIGS. 8A and 8B, essentially similar to the two stages of heat exchanger 1a in FIGS. 1A-J. This configuration is special because conduits 20 of thermal elements 2j1, 2j2 and channels 34 define four interface circuits 4j1, 4j2, 4j3, and 4j4. In effect, this heat exchanger 1j eliminates the need for switching means necessary to alternately connect thermal elements 1j to the external "hot" and "cold" circuits. This thermal heat exchanger 1j may obviously be combined with another similar or dissimilar thermal exchanger 1j, diagonally from a connecting interface plate, or any other adapted means.

With reference to FIGS. 9-11, heat exchangers 1k-o comprise several groups 200k-o of thermal elements 2k-o and complementary conduit connectors 300k-o allowing them to communicate. In these examples, the complementary conduit connectors are joined to interface plates 3k-o and comprise one or more complementary channels 340 connecting channels 34 (not shown in these drawings) in each group 200k-o.

Figure 1C:
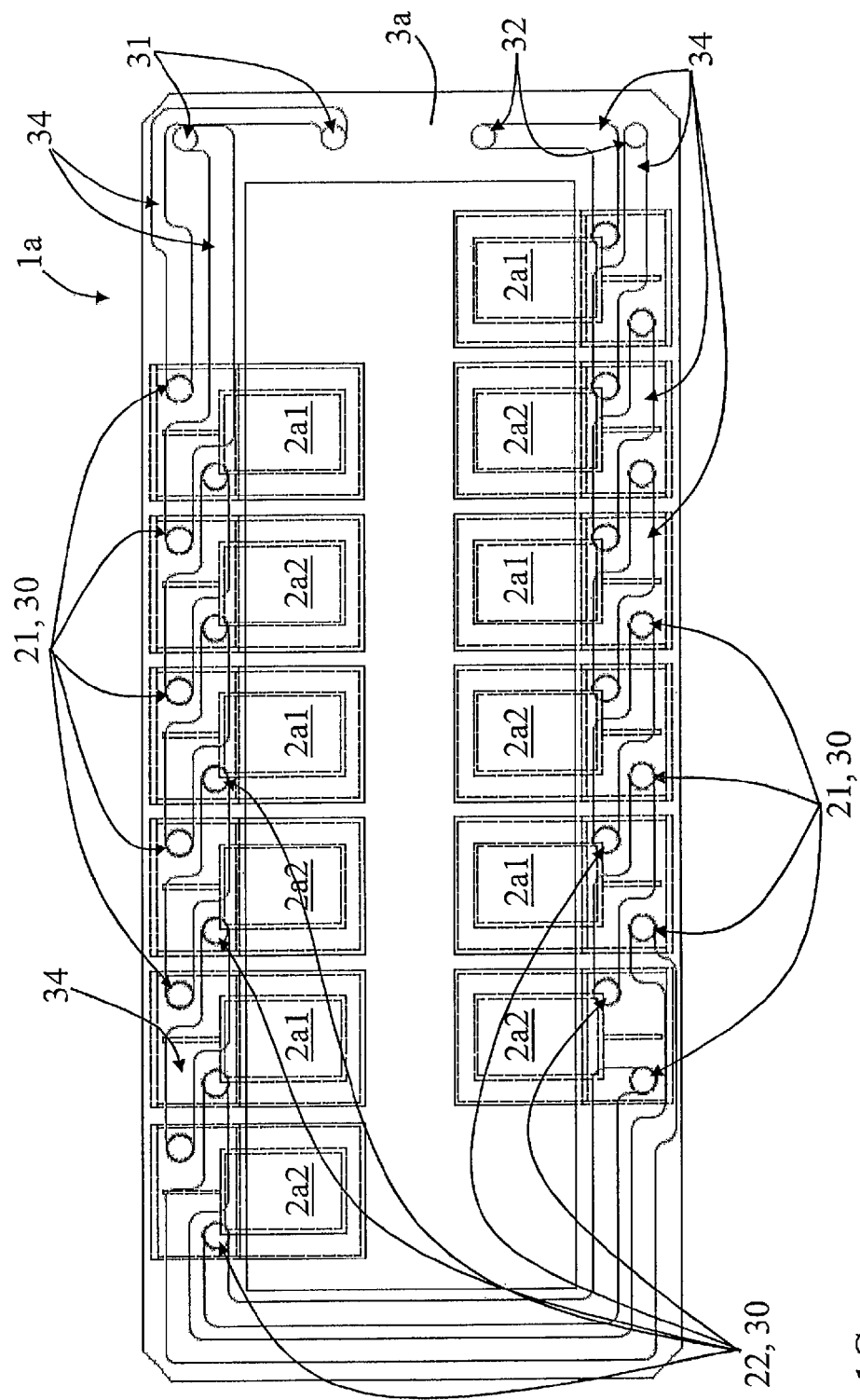
Figure 1D:
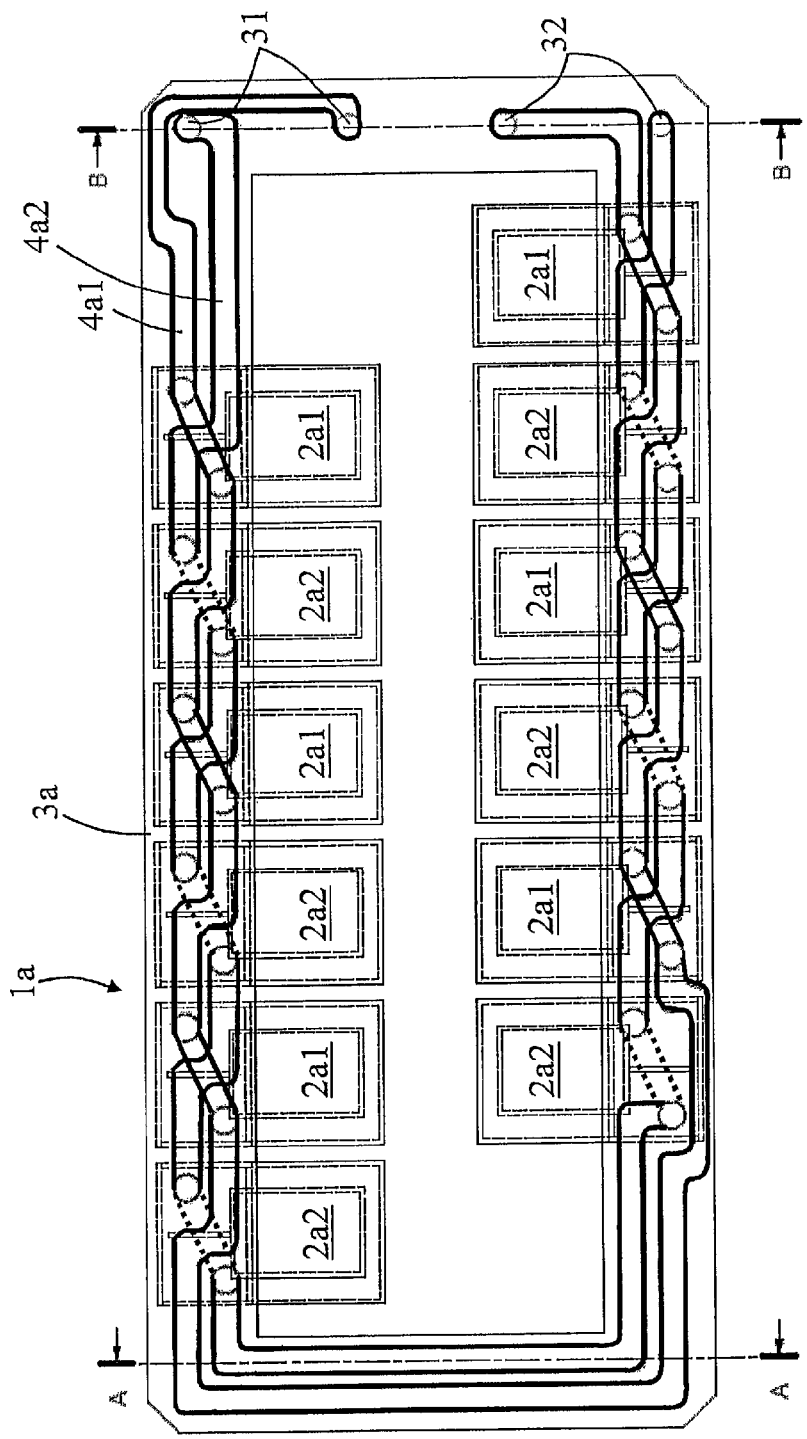
FIG. 1D is a view similar to FIG. 1C in which the hot and cold thermal circuits are shown schematically.
Figure 1I:
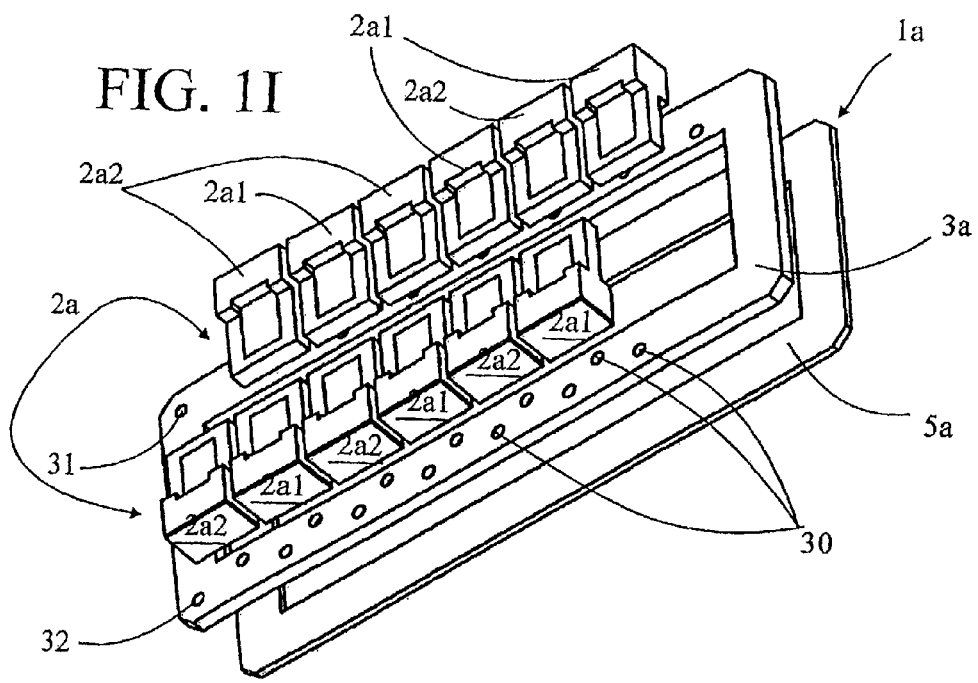
FIGS. 1I and 1J are exploded perspective views, from above and below, of the heat exchanger in the preceding drawings.
Figure 1J:
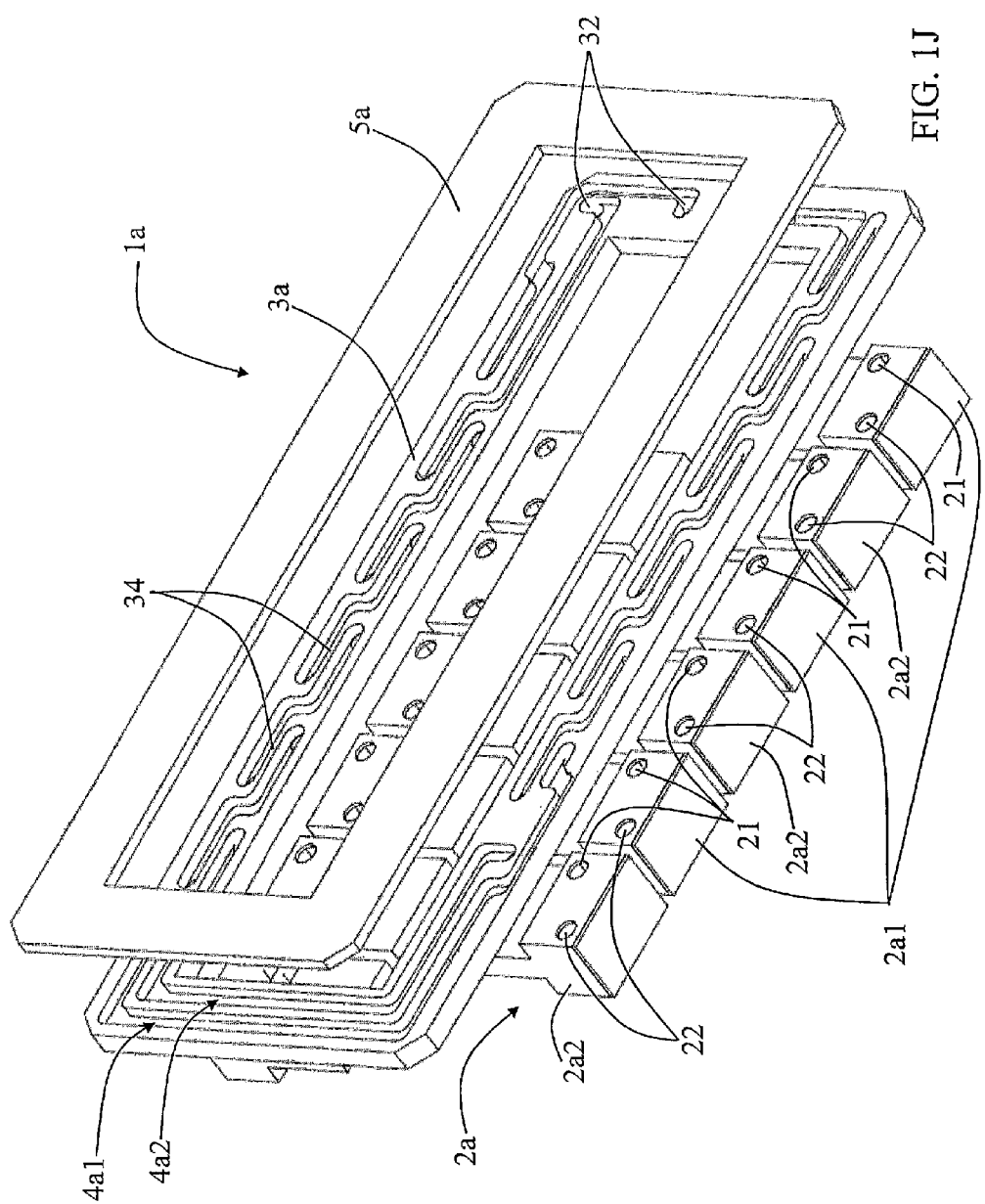
Figure 2C:
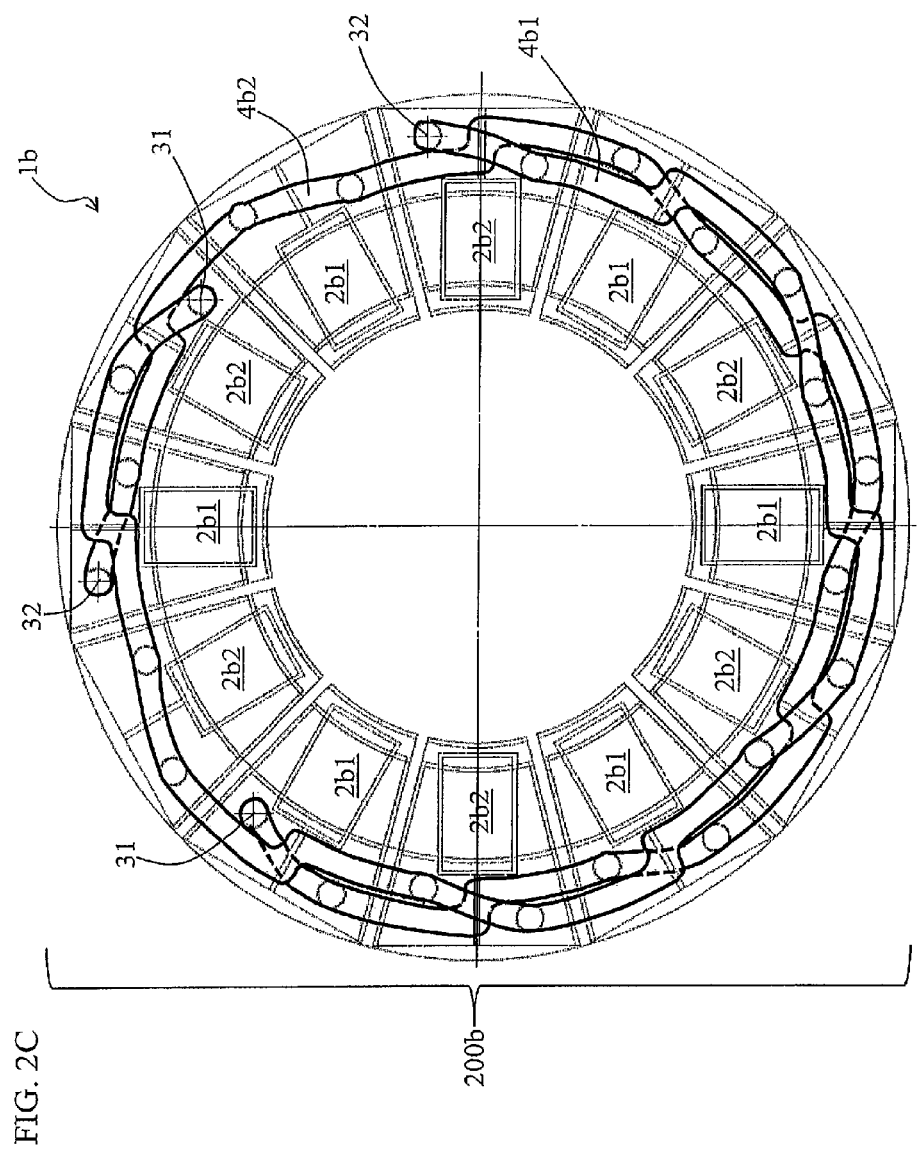
FIG. 2C is a view similar to FIG. 1D of the heat exchanger of FIG. 2A.
Figure 2D:
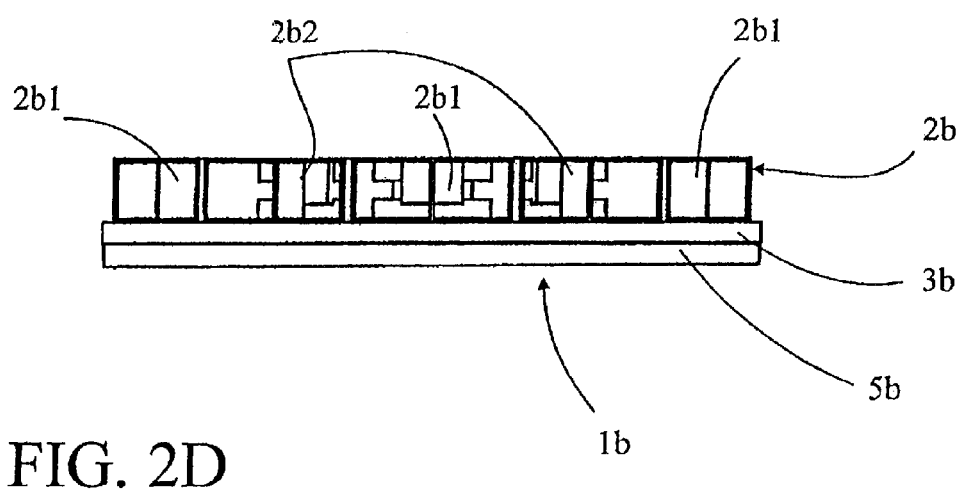
Figure 3C:
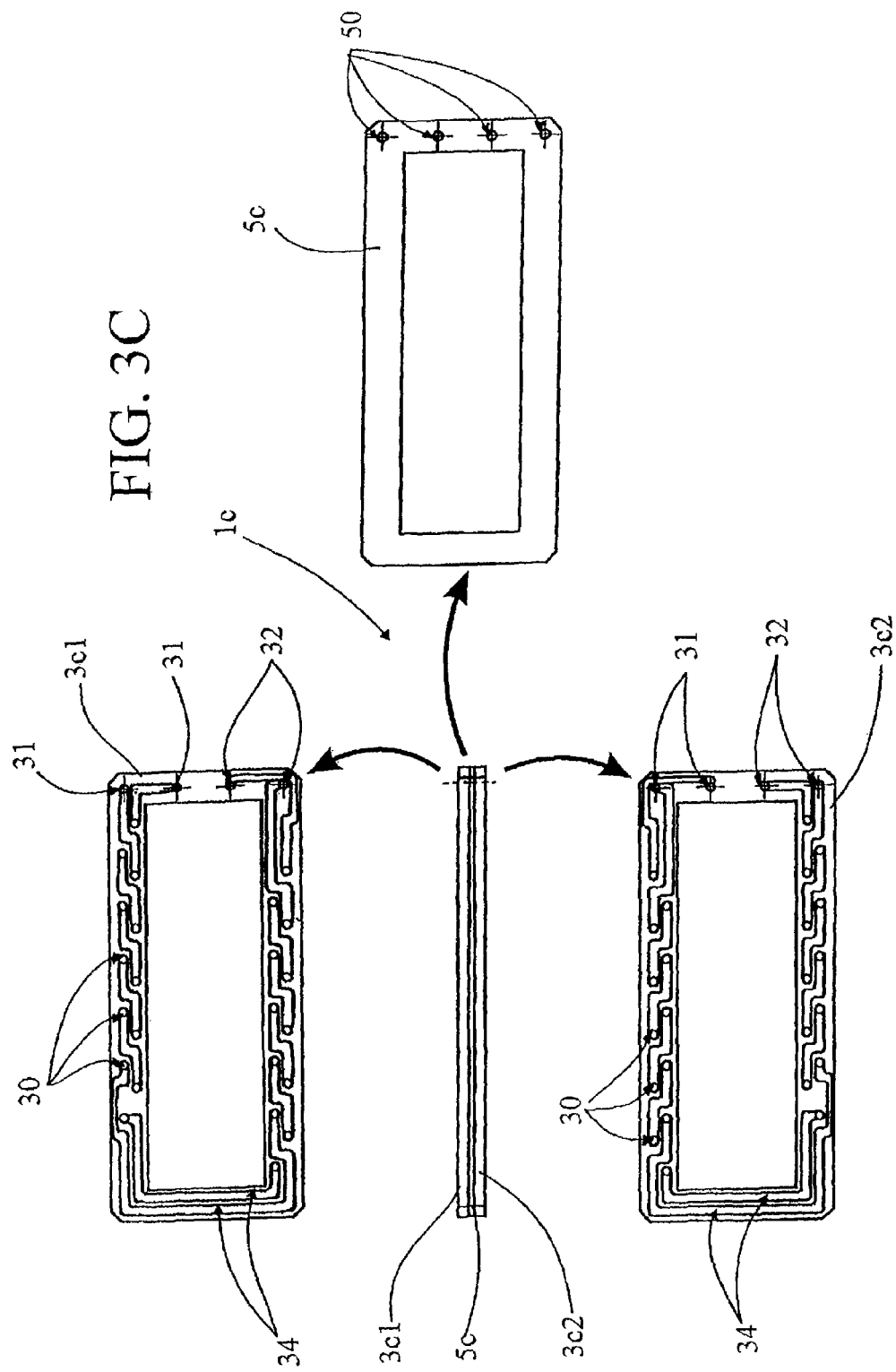
FIG. 3C illustrates assembly by superimposing the interface plates and the closing plate to form the conduit connectors for the heat exchanger of FIGS. 3A, B.
Figure 3D:
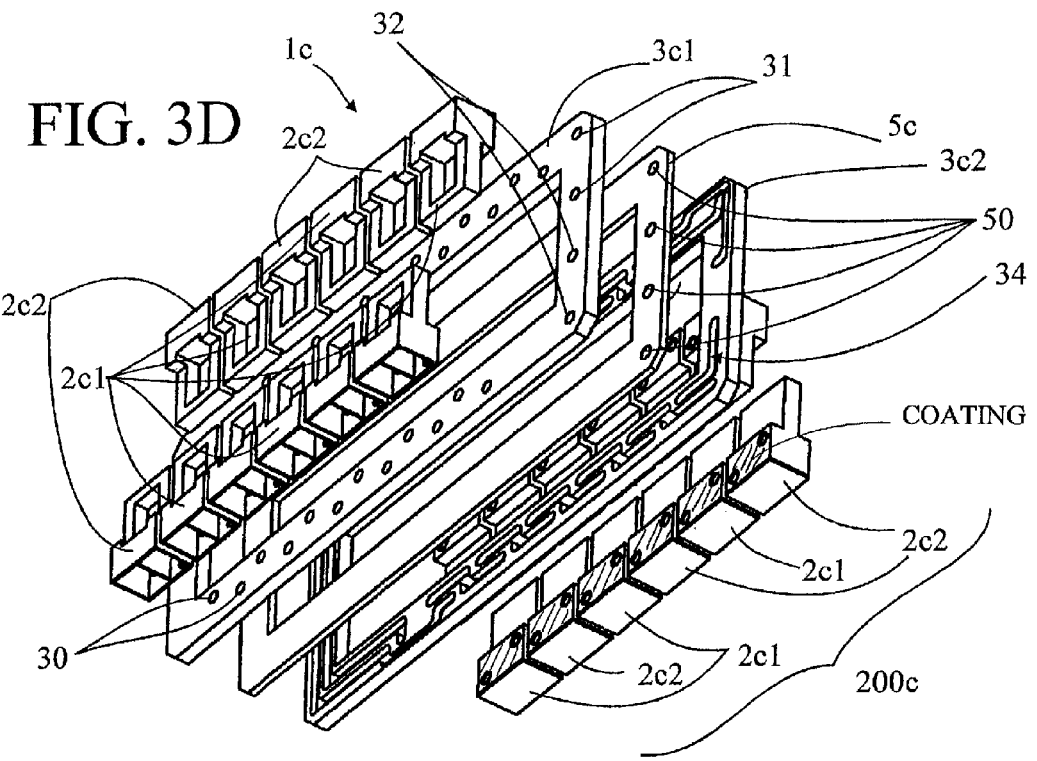
FIGS. 3D and 3E are exploded perspective views from above and below the heat exchanger of FIGS. 3A-C.
Figure 3E:
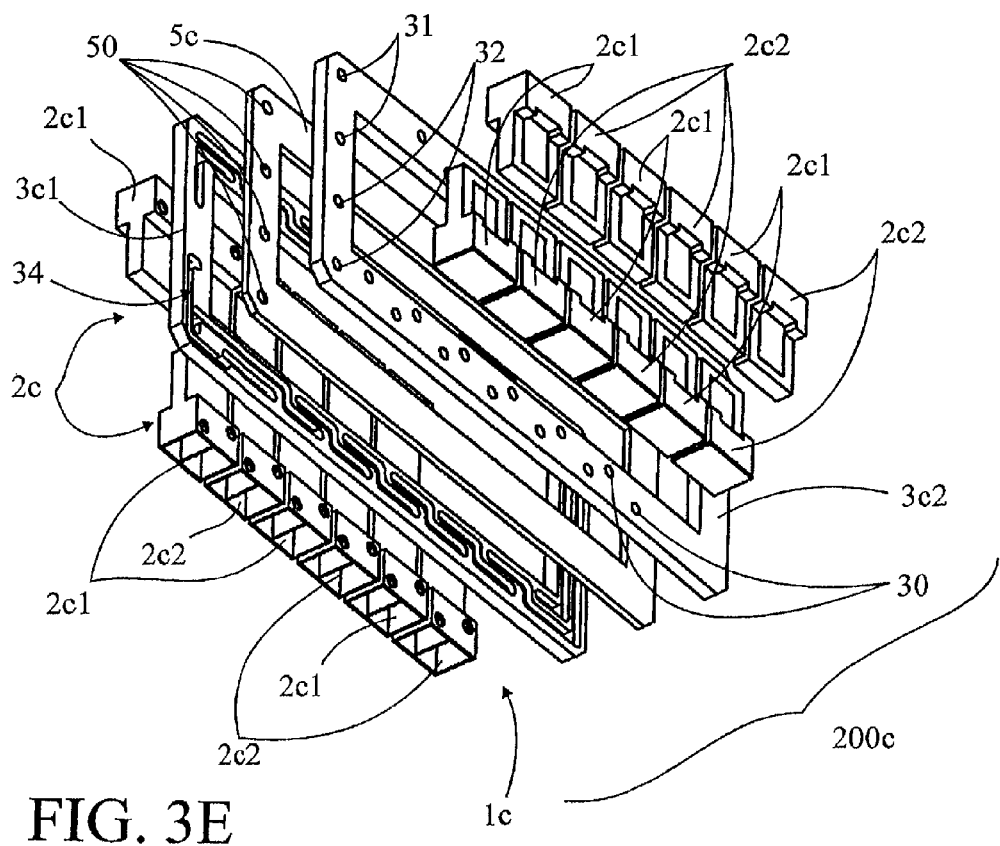

In the example shown in FIGS. 9A and 9B, heat exchanger 1k comprises two groups 200k, 200k' of thermal elements 2k, 2k' each equipped with an interface plate 3k 3k' essentially similar to that of FIGS. 2A-C. Interface plates 3k, 3k' comprise lateral extensions 300k, 300k' extending axially, comprising a complementary channel 340 and defining the complementary Conduit connectors. Complementary channel 340 in each lateral extension 300k, 300k' comprises two conduits 341, 342 and two orifices 343 for connection to an exterior circuit or to another interface plate. Groups 200k, 200k' are superimposed such that conduits 341, 342 are each located in the extension of the other. Conduits 341, 342 are therefore provided to define a complementary connecting circuit joining the interface circuits in each group 200k, 200k' in series, in parallel, or in a mixed series/parallel combination.

Heat exchanger 1l shown in FIG. 10 is constructed in a manner essentially similar to the preceding one. It comprises four groups 200l, 200l', 200l'' of thermal elements 21, 21', 21'' (only three of which are represented), supported by two pairs of interface plates 31, 31' allowing the groups 200l, 200l', 200l'' to be arranged side by side in pairs and stacked. Each pair of interface plates 31, 31' comprises a lateral extension 300l, 300l' equipped with conduits 341, 342 and connecting orifices (not shown) provided to define a complementary connecting circuit joining the interface circuits of groups 200l, 200l', 200l'' in series, in parallel, or in a mixed series/parallel combination. It is obviously possible to provide triple interface plates or other numbers in order to have multiple groups of thermal elements.

Figure 11A:
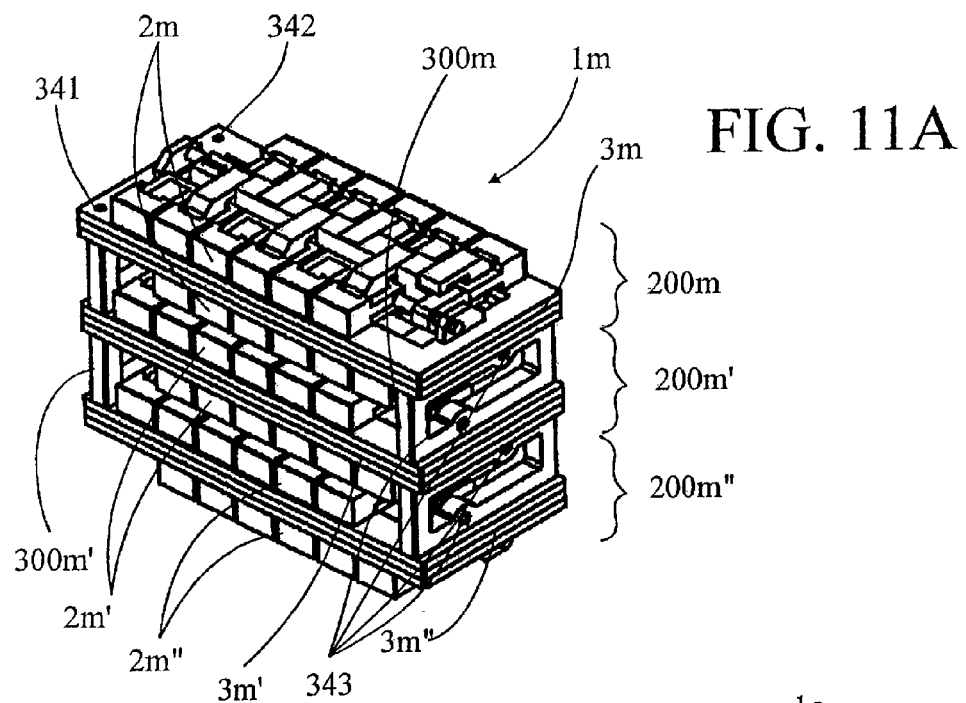
Figure 11C:
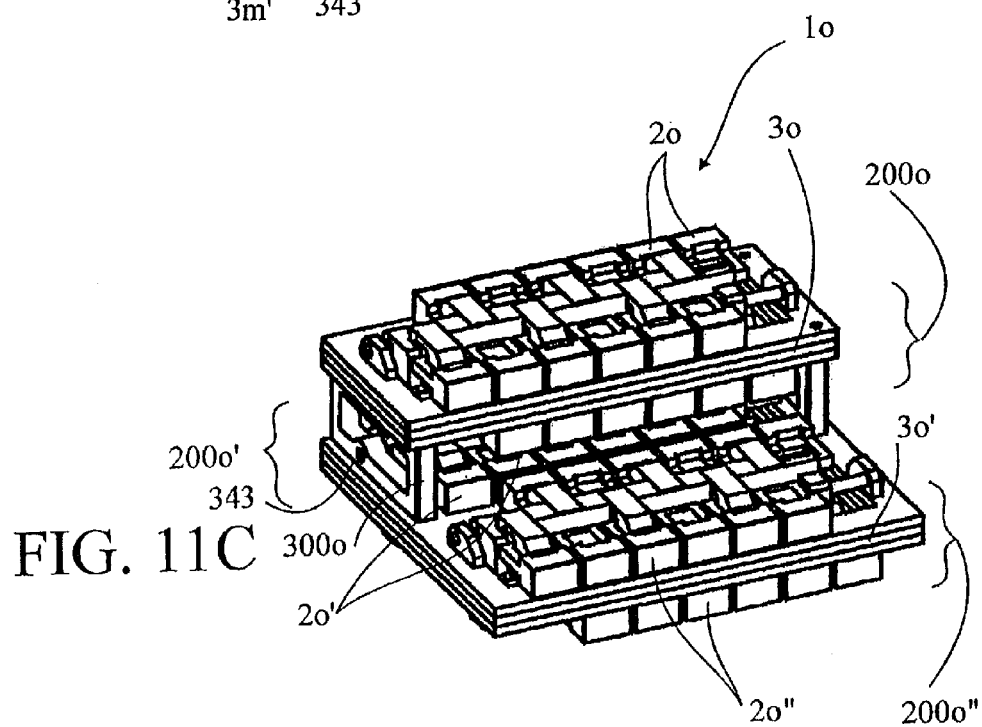
Figure 11B:
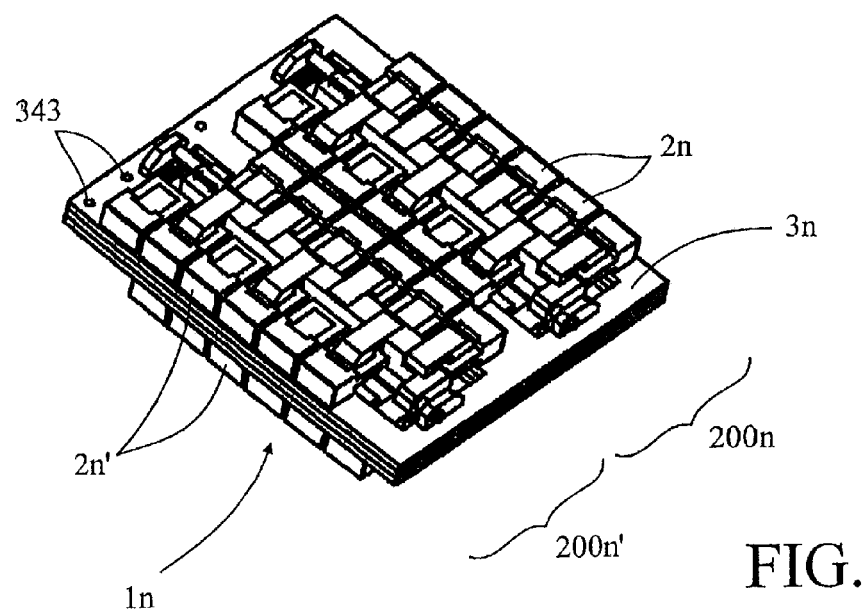

Heat exchangers 1m-o shown in FIGS. 11A-C are constructed in a manner essentially similar to those in FIGS. 3A-E.

Heat exchanger 1m in FIG. 11A comprises three groups 200m, 200m', 200m'' of thermal elements 2m, 2m', 2m'' superimposed by interface plates 3m, 3m', 3m''. Two of the interface plates 3m, 3m', 3m'' comprise two lateral extensions 300m, 300m' equipped with conduits 341, 342 and with connecting orifices to define a complementary connecting circuit joining the interface circuits of the different groups in series, in parallel, or in a series/parallel combination.

Heat exchanger 1n in FIG. 1B comprises two groups 200n, 200n' of thermal elements 2n, 2n' supported by a single interface plate 3n allowing groups 200n, 200n' to be aligned side by side. The interface plate 3n comprises complementary a channel (not shown) for connecting the interface circuits of groups 200n, 200n' in series, in parallel, or in a series/parallel combination. In addition, it comprises connecting orifices 343 to allow connection to an external circuit EC or to another interface plate.

Heat exchanger 1o in FIG. 11C combines the two preceding examples by allowing the superimposition combined with the side-by-side alignment of three groups 200o, 200o', 200'' of thermal elements 2o, 2o', 20'' and connecting them through a complementary circuit using two interface plates 30, 30'.

These last embodiments allow the configuration and operation of the heat exchangers of the invention to be modified at will in order to produce stronger thermal power or higher thermal intensity.

In these examples, the magnetic fields are generated by permanent magnets, movable magnetic assemblies, or fixed alternately supplied electromagnets. Obviously, they could be generated by any other equivalent means.

This description clearly shows that heat exchanger 1a-o of the invention responds to the stated objectives. More specifically, it provides a simple, reliable means of connecting a significant number of thermal elements 2a-o by replacing pipes and conventional connections with an interface plate 3a-o integrating channels 34 in the form of grooves and/or perforations, and connectors in the form of connecting orifices 30 and traversing orifices 40, 50. This interface allows the simultaneous connection of thermal elements 2a-o in a single group 200 a-o and/or several distinct groups 200a-o and/or several heat exchangers 1a-o in a series, parallel, or a mixed connection, configurations that are currently difficult or impossible to achieve. The significantly smaller number of mechanical parts leads to increased reliability in use, limits leakage, and reduces both the manufacturing and maintenance costs of heat exchanger 1a-o.

This type of heat exchanger 1a-o can be used in any industrial or domestic application that requires cooling, heating, air conditioning, or temperature regulation.

The present invention is not limited to the exemplary embodiments described, but extends to any modification or variation obvious to a person skilled in the art which remains within the scope of protection defined by the attached claims.

The invention claimed is:

1. A heat exchanger (1a-o) comprising:
   at least one group (200a-o) of at least first and second thermal elements (2a-o), each of the at least first and second thermal elements (2a-o) comprising at least one inlet orifice (21) and at least one outlet orifice (22) connected to each other by a conduit (20) traversing the thermal element (2a-o) for conveying thermal fluid through the thermal element (2a-o),
   a plurality of separate conduit connectors connecting the conduit (20) of the at least first thermal element (2a-o) and the conduit (20) of the at least second thermal element (2a-o) with at least one external circuit (EC) of the heat exchanger (1a-o),
   wherein the plurality of separate conduit connectors are at least partially formed by at least one interface plate (3a-o), and the outlet of the at least first thermal element (2a-o) is connected with the inlet of the at least second thermal element (2a-o) by one of the plurality of separate conduit connectors,
   the at least one interface plate having at least one channel (34) with connecting orifices (30) located opposite the inlet orifices (21), and the outlet orifices (22) in the at least first and second thermal elements (2a-o) to define at least one interface circuit (4a-o) which facilitates circulation of the thermal fluid between the at least first and second thermal elements (2a-o) and the at least one interface plate (3a-o) through one of a series, a parallel, and a mixed connection, and,
   the at least one interface plate (3a-o) also having at least one supply orifice (31) and, at least one discharge orifice (32) which connect the interface circuit (4a-o) to the at least one external circuit (EC) of the heat exchanger (1a-o).

2. The heat exchanger (1a-o) according to claim 1, wherein the at least one interface plate (3a-o) comprises at least two channels (34), each of the at least two channels having at least one supply orifice (31), one discharge orifice (32), and connecting orifices (30) and defining two distinct interface circuits (4a-o) that are connected to two external circuits (EC) of the heat exchanger (1a-o).

3. The heat exchanger (1k-o) according to claim 1, wherein the heat exchanger further comprises an additional group (200k-o) of thermal elements (2k-o), each of the groups of thermal elements having at least one interface plate (3k-o) and complementary connectors (300k-o) for connecting the interface plates (3k-o) to one another and interface circuits of the corresponding groups (200k-o).

4. The heat exchanger (1c-f) according to claim 1, wherein the conduit connector comprises at least first and second interface plates (3c1, 3c2-3f1, 3f2) superimposed back to back, each of the first and second interface plates (3c1, 3c2-3f1, 3f2) comprising at least one channel (34), one supply orifice (31), one discharge orifice (32), and connecting orifices (30) connected to a unit of thermal elements (2c-2f).

5. The heat exchanger (1e, 1f) according to claim 4, wherein the first and second interface plates (3e1, 3e2, 3f1, 3f2) have traversing orifices (50) disposed opposite each other to define a common interface circuit.

6. The heat exchanger (1c-f) according to claim 5, wherein the conduit connector comprises first and second interface plates (3a-o), and a closing plate (4c-f) is located between the first and second interface plates (3c1, 3c2-3f1, 3f2) to form the channel (34).

7. The heat exchanger (1c, 1e, 1f) according to claim 6, wherein the closing plate (5c, 5e, 5f) comprises traversing orifices (50) opening into the channels (34) to connect the channels.

8. The heat exchanger (1f) according to claim 7, wherein the closing plate (5f) comprises a switch (6) movable between at least two positions so as to modify a mode of connection between the interface circuits.

9. The heat exchanger (1f) according to claim 8, wherein the switch (6) is selected from the group consisting of at least one of a slide block, a core, and a sliding unit, and is governed by a control mechanism.

10. The heat exchanger (1h) according to claim 1, wherein the channel (34) is at least partially formed of a network of perforations through a wall of the at least one of interface plate (3h) selectively blocked by plugs depending upon a function of the interface circuit (4h) to be formed.

11. The heat exchanger (1a-g, 1j-o) according to claim 1, wherein the channel (34) is at least partially formed by one or more grooves located on at least one surface of the at least one interface plate (3a-g, 3j-o).

12. The heat exchanger (1a-g, 1j-o) according to claim 11, wherein the one or more grooves are formed by one of machining, engraving, or casting.

13. The heat exchanger (1a-g, 1j-o) according to claim 11, wherein the conduit connector comprises at least one closing plate (5a-g, 5j) that is superimposed on the surface of the at least one interface plate (3a-g, 3j) on which the one or more grooves are located to form the channel (34).

14. The heat exchanger (1a-o) according to claim 1, wherein the conduit connector comprises sealing elements (SE) located at least between the first and second thermal elements (2a-o) and the at least one interface plate (3a-o).

15. The heat exchanger (1a-o) according to claim 14, wherein the sealing elements (SE) are selected from the group consisting of a coating, a fluoropolymer resin sheet, and a liquid seal.

16. The heat exchanger (1*a-o*) according to claim 1, wherein the at least one interface plate (3*a-o*) is at least partially made of a thermally insulating material.

17. A heat exchanger (1*a-o*) comprising:
- at least one group (200*a-o*) comprising at least first and second thermal elements (2*a-o*), each of the first and the second thermal elements (2*a-o*) having an inlet orifice (21), for receiving thermal fluid, an outlet orifice (22), for discharging thermal fluid, and a conduit (20) connecting the inlet orifice (21) with the outlet orifice (22) so that the fluid traverses through the thermal element (2*a-o*) via the conduit (20);
- the first and the second thermal elements being connected to an interface plate (3*a-o*);
- a plurality of separate conduit connectors being defined in the interface plate (3*a-o*), and each end of the plurality of separate conduit connectors terminating, at the surface of the interference plate (3*a-o*), as a connection orifice;
- the inlet orifice (21) of the first thermal element (2*a-o*) being fluidly connected with the connection orifice of a first one of the plurality of conduit connectors;
- the outlet orifice (22) of the first thermal element (2*a-o*) being fluidly connected in series with the inlet orifice (21) of the second thermal element via the connection orifices of a second one of the plurality of conduit connectors; and,
- the outlet orifice (22) of the second thermal element (2*a-o*) being fluidly connected with the connection orifice of a third one of the plurality of conduit connectors.

18. The heat exchanger (1*a-o*) according to claim 17, wherein the at least one interface plate (3*a-o*) has at least one supply orifice (31) and at least one discharge orifice (32) which connect an interface circuit (4*a-o*) of the heat exchanger (1*a-o*) to the at least one external circuit (EC).

19. The heat exchanger (1*a-o*) according to claim 17, wherein each of the inlet orifices (21) and the outlet orifices (22) are both defined by a common surface of each of the first and the second thermal elements,
- the connecting orifices (30) are flush with the surface of the interface plate (3*a-o*),
- the first and the second thermal elements (2*a-o*) are adjacent and connected to separate and distinct interface circuits (4*a-o*),
- each inlet orifice (21) and outlet orifice (22) are directly fluidly connected to one of a connecting orifices (30), a supply orifice (31), and a discharge orifice (32), and,
- the first and the second thermal elements (2*a-o*) each comprise a magnetocaloric material.

20. A heat exchanger (1*a-o*) comprising:
- at least one group (200*a-o*) of at least two thermal elements (2*a-o*), each of the at least two thermal elements (2*a-o*) comprises at least one inlet orifice (21) and at least one outlet orifice (22) connected to each other by at least one conduit (20) traversing each thermal element (2*a-o*) for receiving thermal fluid;
- a conduit connector connecting the at least one conduit (20) to another conduit (20) and to at least one external circuit of the heat exchanger (1*a-o*); wherein
- the conduit connector comprises at least one interface plate (3*a-o*) abutting the at least two thermal elements (2*a-o*);
- the at least one interface plate has at least one channel (34) and has a plurality of connecting orifices (30) which are defined by a surface of the interface plate;
- the connecting orifices (30) are aligned with and located opposite the inlet orifices (21) and the outlet orifices (22) in the at least two thermal elements (2*a-o*);
- the at least one conduit (20), the at least one inlet orifice (21), the at least one outlet orifice (22), the at least one channel (34), and the connecting orifices (30) all define at least one interface circuit (4*a-o*) which facilitates circulation of the thermal fluid between the at least two thermal elements (2*a-o*) and the at least one interface plate (3*a-o*) through one of a series, a parallel, and a mixed connection; and,
- the surface of the at least one interface plate (3*a-o*) also defining at least one supply orifice (31) and at least one discharge orifice (32) which connects the interface circuit (4*a-o*) to at least one external circuit of the heat exchanger (1*a-o*).

* * * * *